(12) United States Patent
Goenka

(10) Patent No.: US 9,109,841 B2
(45) Date of Patent: Aug. 18, 2015

(54) AIR TO REFRIGERANT HEAT EXCHANGER WITH PHASE CHANGE MATERIAL

(75) Inventor: Lakhi Nandlal Goenka, Ann Arbor, MI (US)

(73) Assignee: Halla Visteon Climate Control Corporation, Daejeon-si (KR)

( * ) Notice: Subject to any disclaimer, the term of this patent is extended or adjusted under 35 U.S.C. 154(b) by 685 days.

(21) Appl. No.: 13/267,356

(22) Filed: Oct. 6, 2011

(65) Prior Publication Data

US 2013/0087316 A1 Apr. 11, 2013

(51) Int. Cl.
*F28D 20/02* (2006.01)
*F28D 1/053* (2006.01)
*B60H 1/00* (2006.01)
*F24F 5/00* (2006.01)
*F28D 20/00* (2006.01)

(52) U.S. Cl.
CPC ............ *F28D 1/05383* (2013.01); *B60H 1/005* (2013.01); *B60H 1/00328* (2013.01); *F28D 20/026* (2013.01); *F24F 5/0021* (2013.01); *F28D 1/05391* (2013.01); *F28D 20/02* (2013.01); *F28D 2020/0008* (2013.01); *F28D 2020/0013* (2013.01); *Y02E 60/145* (2013.01); *Y02E 60/147* (2013.01)

(58) Field of Classification Search
CPC .................. Y02E 60/147; F28D 20/02; F28D 2020/0013; F28D 1/05391; F28D 2020/0008; F28D 20/026; B60H 1/005; F24F 5/0021
USPC ......... 165/10, 140, 156, 104.17; 62/515, 518, 62/524, 525
See application file for complete search history.

(56) References Cited

U.S. PATENT DOCUMENTS

| 6,568,205 | B2 | 5/2003 | Bureau et al. |
| 6,640,568 | B2 | 11/2003 | Shirota et al. |
| 6,691,527 | B2 | 2/2004 | Bureau et al. |
| 6,708,512 | B2 | 3/2004 | Kitamura et al. |
| 6,742,352 | B2 | 6/2004 | Kampf |
| 6,854,513 | B2 * | 2/2005 | Shirota et al. ................. 165/203 |
| 7,156,156 | B2 | 1/2007 | Haller et al. |
| 7,406,998 | B2 * | 8/2008 | Kudo .............................. 165/10 |
| 7,891,211 | B2 | 2/2011 | Aikawa |

(Continued)

FOREIGN PATENT DOCUMENTS

| FR | 2861166 A1 | 4/2005 |
| JP | 4218424 A | 8/1992 |

(Continued)

*Primary Examiner* — Marc Norman
*Assistant Examiner* — Max Snow
(74) *Attorney, Agent, or Firm* — Fraser Clemens Martin & Miller LLC; James D. Miller

(57) ABSTRACT

A thermal energy heat exchanger for an air conditioning system includes a row of first tubes, a row of second tubes, and a row of third tubes. Inside, heat is exchanged between air, refrigerant, and phase change material, also known as PCM, cool storage material, cold storage material, and latent heat storage material. The first row of tubes carries refrigerant. A portion of the second row of tubes and a portion of the third row of tubes carry refrigerant. The remainder of the second and third rows of tubes carry phase change material. The phase change material can be associated with a phase change material manifold. Advantageously, the melting point of phase change material in the second tubes can be different from the melting point of the phase change material in the third tubes.

17 Claims, 9 Drawing Sheets

(56) References Cited

U.S. PATENT DOCUMENTS

| | | | |
|---|---|---|---|
| 7,891,412 B2 | 2/2011 | Loup et al. | |
| 8,191,618 B2* | 6/2012 | Gering et al. | 165/202 |
| 2003/0046944 A1* | 3/2003 | Kitamura et al. | 62/227 |
| 2005/0150639 A1* | 7/2005 | Iwasaki et al. | 165/140 |
| 2006/0266501 A1* | 11/2006 | So et al. | 165/140 |
| 2007/0039714 A1* | 2/2007 | Loup et al. | 165/43 |
| 2007/0068650 A1 | 3/2007 | Haller et al. | |
| 2007/0227714 A1* | 10/2007 | Takeuchi et al. | 165/151 |
| 2009/0095015 A1 | 4/2009 | Kerler et al. | |
| 2009/0120624 A1* | 5/2009 | Lim et al. | 165/158 |
| 2009/0211732 A1* | 8/2009 | Goenka | 165/104.17 |
| 2009/0236071 A1* | 9/2009 | Jensen | 165/10 |
| 2009/0301696 A1* | 12/2009 | Iwasaki | 165/140 |
| 2010/0000707 A1 | 1/2010 | Tsubone et al. | |
| 2010/0012289 A1 | 1/2010 | Haussmann | |
| 2010/0018231 A1 | 1/2010 | Haller et al. | |
| 2010/0157525 A1* | 6/2010 | Ullman et al. | 361/688 |
| 2010/0175849 A1 | 7/2010 | Bellenfant et al. | |
| 2010/0257870 A1 | 10/2010 | Suzuki et al. | |
| 2010/0300140 A1* | 12/2010 | Leitzel et al. | 62/498 |
| 2010/0307180 A1 | 12/2010 | Yamada et al. | |
| 2010/0313587 A1* | 12/2010 | Wolfe et al. | 62/244 |
| 2011/0154855 A1* | 6/2011 | Sasaki et al. | 62/524 |
| 2011/0239696 A1* | 10/2011 | Takagi | 62/524 |

FOREIGN PATENT DOCUMENTS

| | | |
|---|---|---|
| JP | 2000205777 A | 7/2000 |
| JP | 2003336974 A | 11/2003 |
| JP | 2004184071 A | 7/2004 |

* cited by examiner

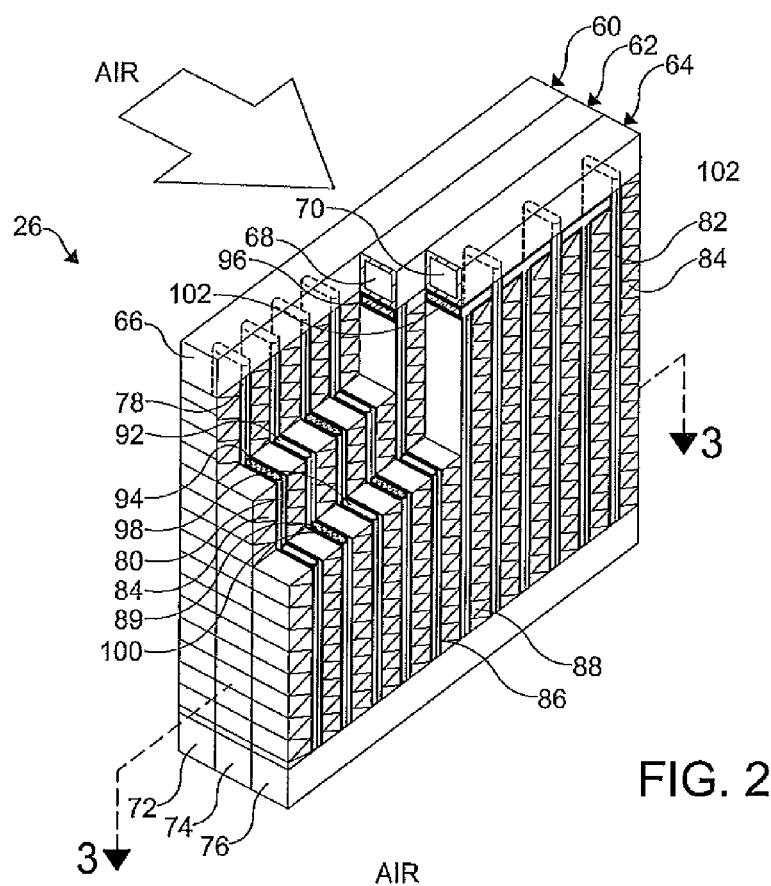
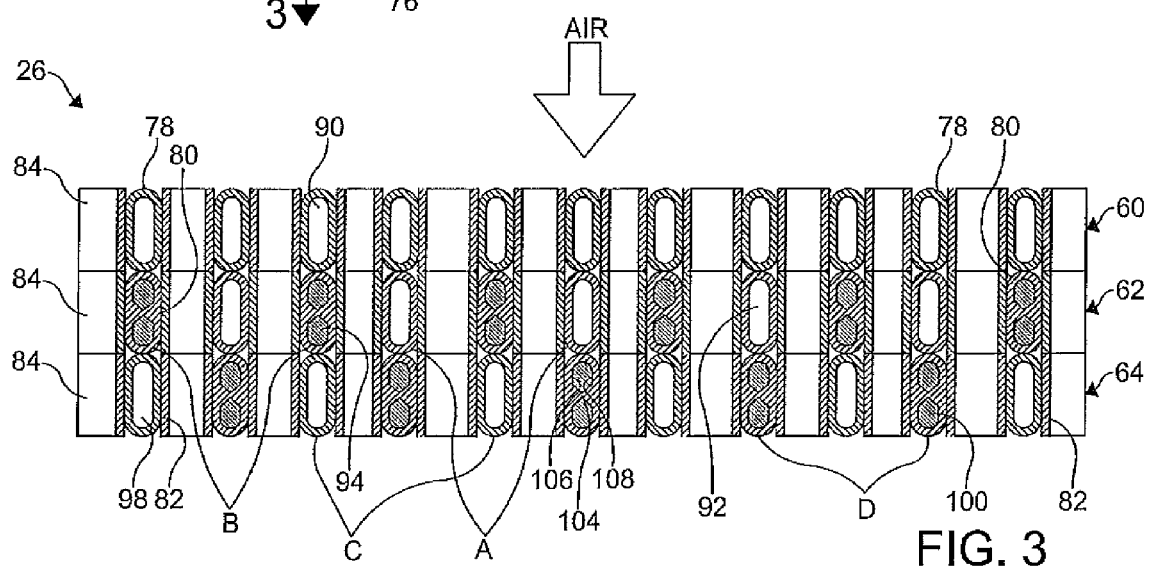

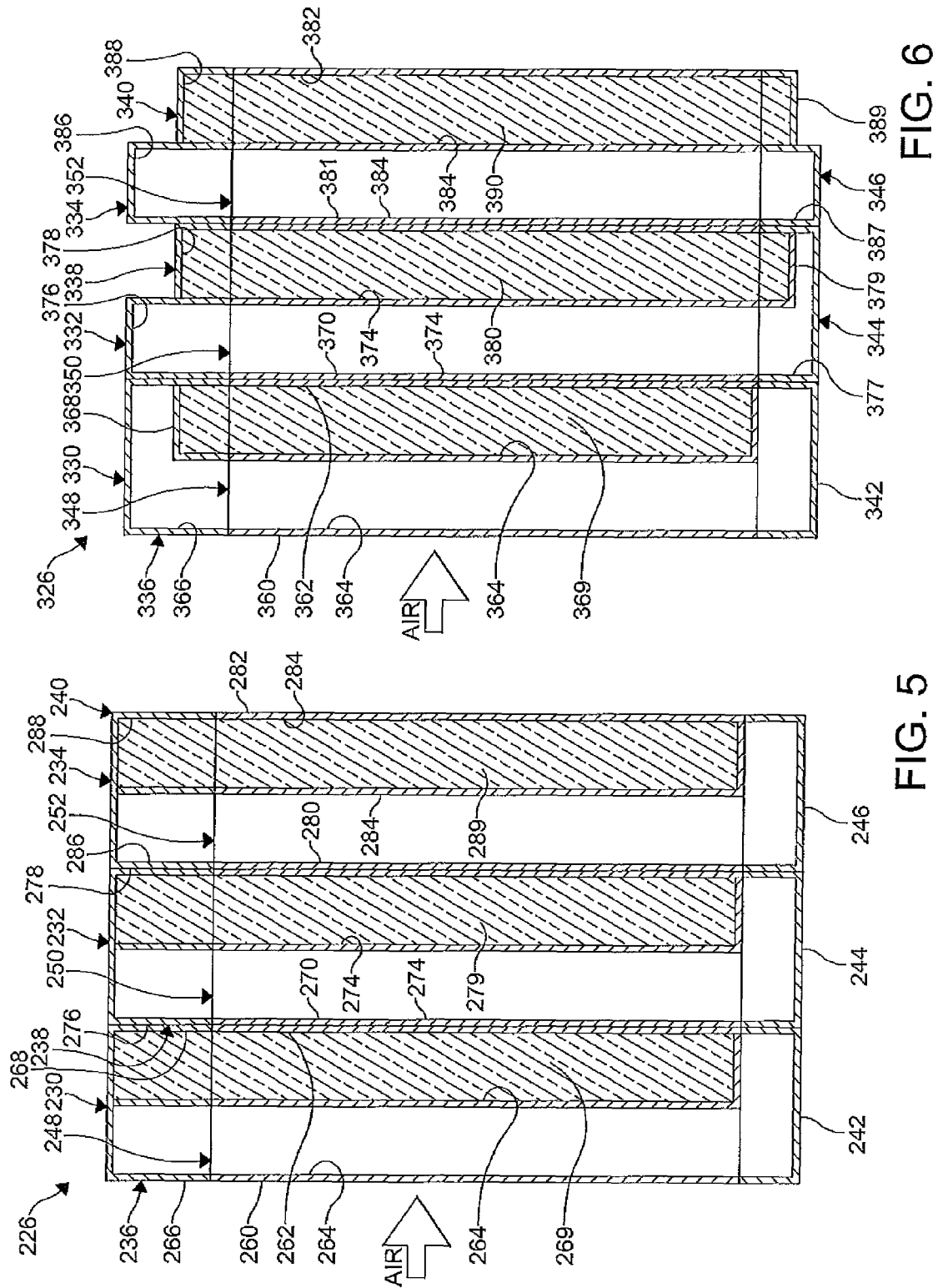

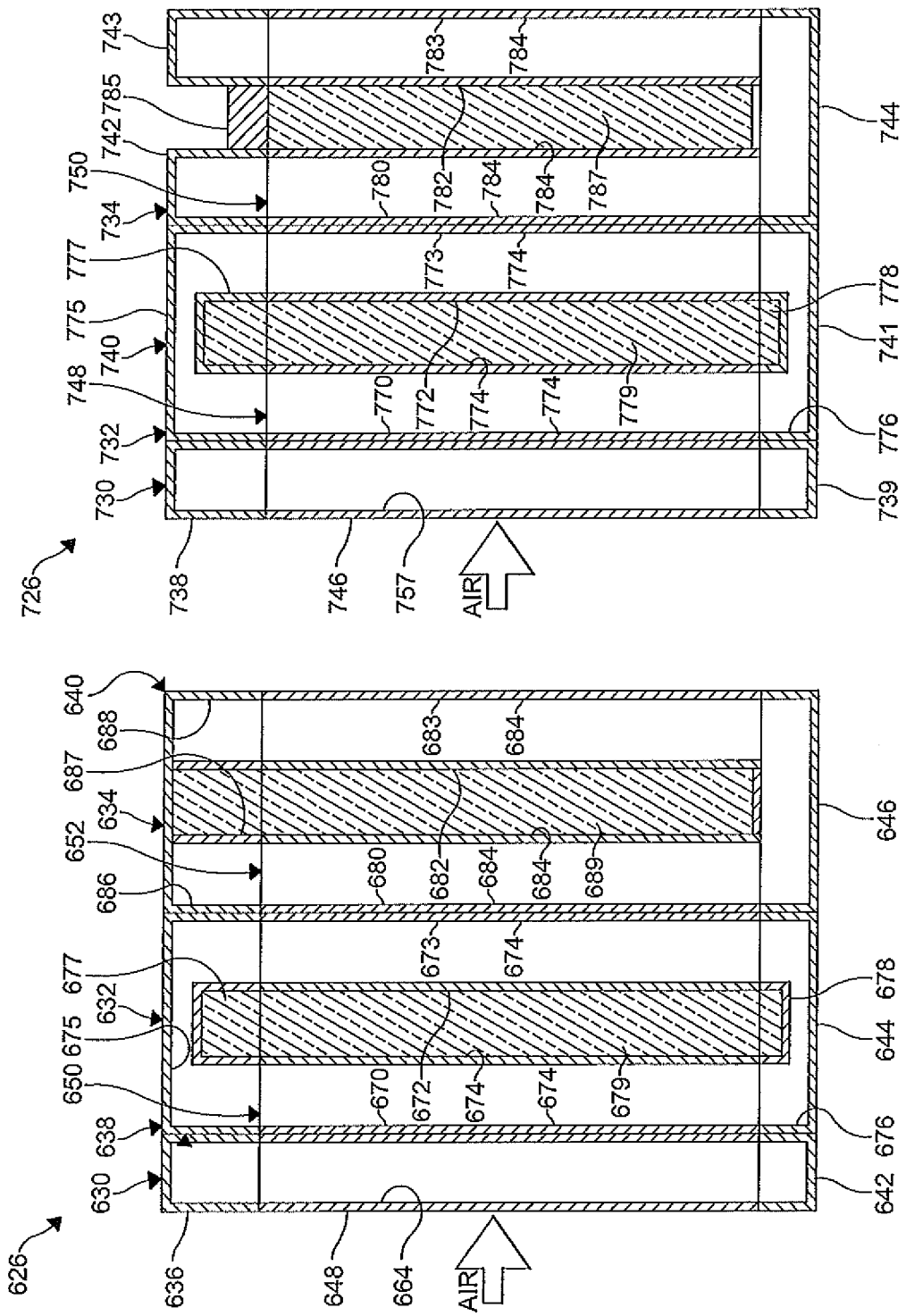

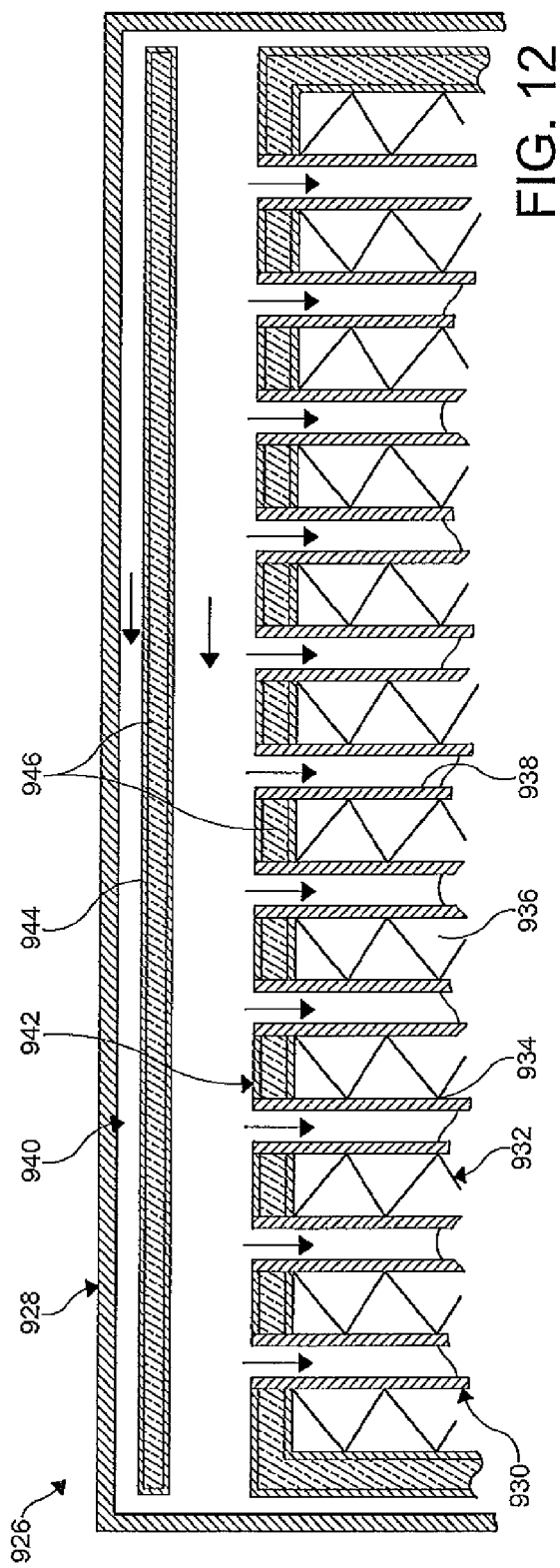
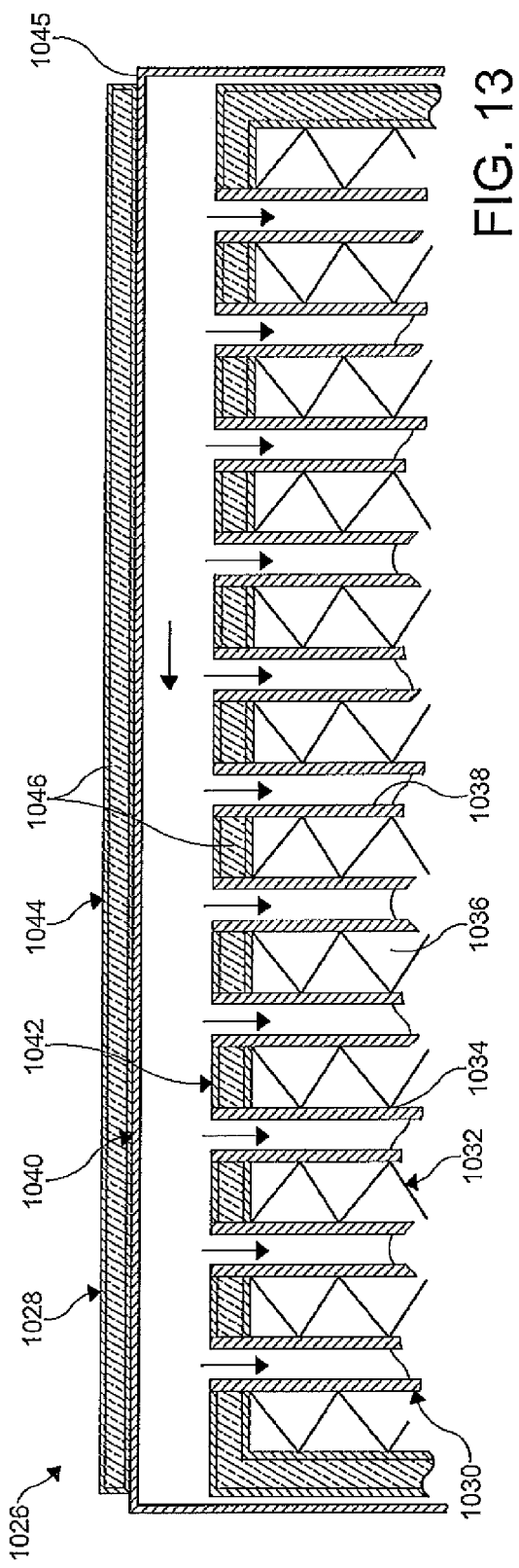

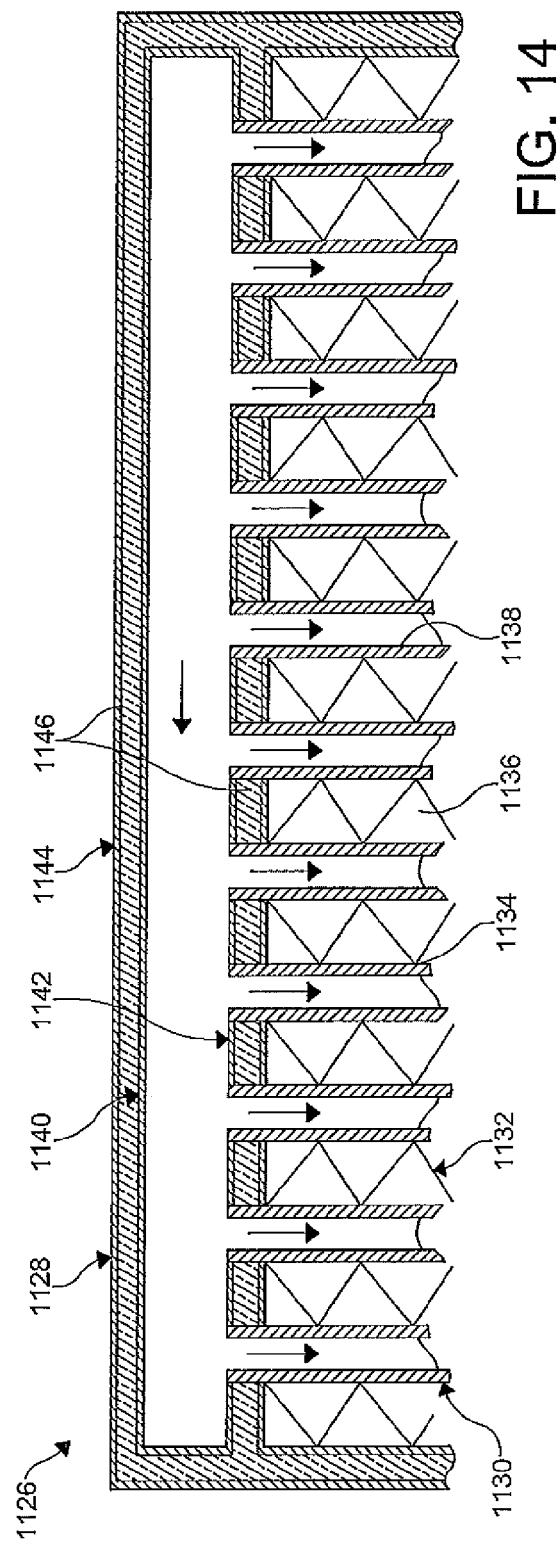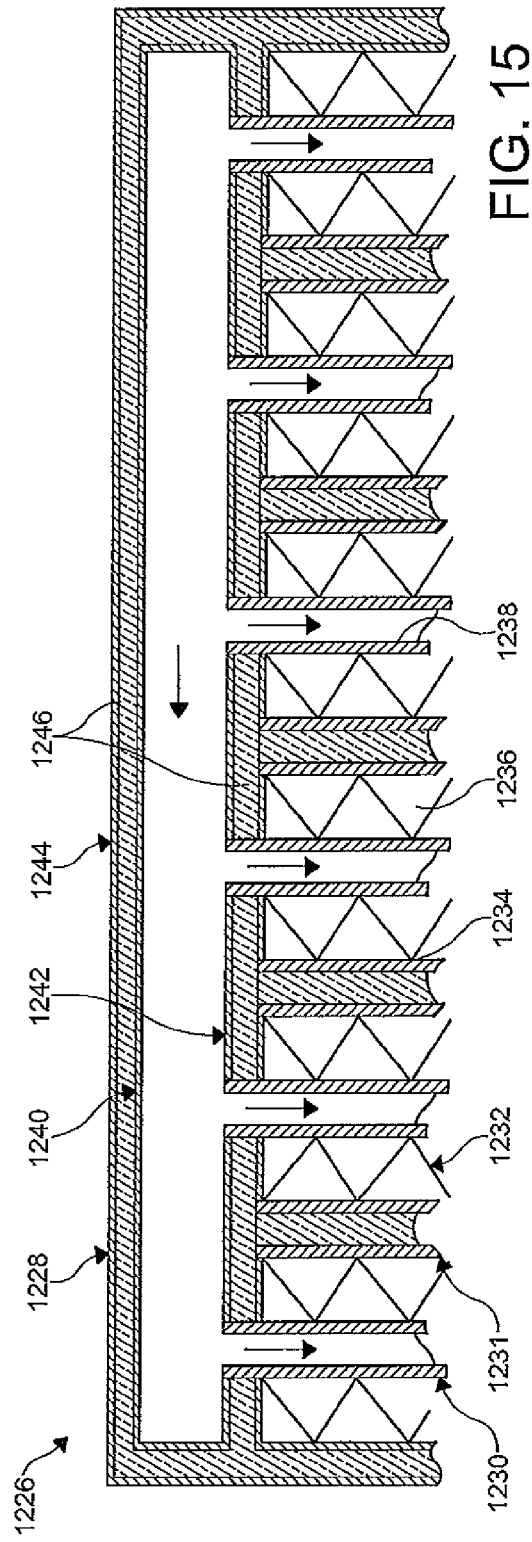

AIR TO REFRIGERANT HEAT EXCHANGER WITH PHASE CHANGE MATERIAL

FIELD OF THE INVENTION

The invention relates to a climate control system for a vehicle and more particularly to a heating, ventilating, and air conditioning system of a vehicle having a thermal energy exchanger disposed therein.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilating and air conditioning (HVAC) system. The HVAC system conditions air flowing therethrough and distributes the conditioned air throughout the passenger compartment.

Typically, a compressor of a refrigeration system provides a flow of a fluid having a desired temperature to an evaporator disposed in the HVAC system to condition the air. The compressor is generally driven by a fuel-powered engine of the vehicle. However, in recent years, vehicles having improved fuel economy over the fuel-powered engine and other vehicles are quickly becoming more popular as a cost of traditional fuel increases. The improved fuel economy is due to known technologies such as regenerative braking, electric motor assist, and engine-off operation. Although the technologies improve fuel economy, accessories powered by the fuel-powered engine no longer operate when the fuel-powered engine is not in operation. One major accessory that does not operate is the compressor of the refrigeration system. Therefore, without the use of the compressor, the evaporator disposed in the HVAC system does not condition the air flowing therethrough and the temperature of the passenger compartment increases to a point above a desired temperature.

Accordingly, vehicle manufacturers have used a thermal energy exchanger disposed in the HVAC system to condition the air flowing therethrough when the fuel-powered engine is not in operation. One such thermal energy exchanger, also referred to as a cold accumulator, is described in U.S. Pat. No. 6,854,513 entitled VEHICLE AIR CONDITIONING SYSTEM WITH COLD ACCUMULATOR, hereby incorporated herein by reference in its entirety. The cold accumulator includes a phase change material, also referred to as a cold accumulating material, disposed therein. The cold accumulating material absorbs heat from the air when the fuel-powered engine is not in operation. The cold accumulating material is then recharged by the conditioned air flowing from the cooling heat exchanger when the fuel-powered engine is in operation.

In U.S. Pat. No. 6,691,527 entitled AIR-CONDITIONER FOR A MOTOR VEHICLE, hereby incorporated herein by reference in its entirety, a thermal energy exchanger is disclosed having a phase change material disposed therein. The phase change material of the thermal energy exchanger conditions a flow of air through the HVAC system when the fuel-powered engine of the vehicle is not in operation. The phase change material is charged by a flow of a fluid from the refrigeration system therethrough.

While the prior art HVAC systems perform adequately, it is desirable to produce a thermal energy exchanger having a phase change material disposed therein for an HVAC system, wherein an effectiveness and efficiency thereof are maximized.

SUMMARY OF THE INVENTION

In concordance and agreement with the present invention, a thermal energy exchanger having a phase change material disposed therein for an HVAC system, wherein an effectiveness and efficiency thereof are maximized, has surprisingly been discovered.

In one embodiment, the thermal energy exchanger for a heating, ventilating, and air conditioning system comprises: a plurality of first tubes, wherein at least one of the first tubes receives a fluid therein; and a plurality of second tubes disposed downstream of the first tubes, wherein at least one of the second tubes receives the fluid therein and at least one of the tubes includes a phase change material disposed therein, and wherein the at least one of the second tubes receiving the fluid therein and the at least one of the second tubes including the phase change material disposed therein are alternatingly arranged.

In another embodiment, the thermal energy exchanger for a heating, ventilating, and air conditioning system comprises: a plurality of first tubes, wherein the first tubes receive a fluid therein; a plurality of second tubes disposed downstream of the first tubes, wherein at least one of the second tubes receives the fluid therein and at least one of the second tubes includes a phase change material disposed therein; and a plurality of third tubes disposed downstream of the second tubes, wherein at least one of the third tubes receives the fluid therein and at least one of the third tubes includes a phase change material disposed therein, the at least one of the third tubes having the phase change material disposed therein is laterally offset in respect of the at least one of the second tubes having the phase change material disposed therein.

In yet another embodiment, the thermal energy exchanger for a heating, ventilating, and air conditioning system comprises: a plurality of first tubes, wherein at least a portion of the first tubes receives a fluid therein; and a plurality of second tubes disposed downstream of the first tubes, wherein a first portion of at least one of the second tubes receives the fluid therein and a second portion of the at least one of the second tubes includes a phase change material disposed therein.

BRIEF DESCRIPTION OF THE DRAWINGS

The above, as well as other objects and advantages of the invention, will become readily apparent to those skilled in the art from reading the following detailed description of various embodiments of the invention when considered in the light of the accompanying drawings in which:

FIG. 2 is a schematic perspective view of the thermal energy exchanger according to an embodiment of the present invention showing a portion of two layers of the thermal energy exchanger cutaway;

FIG. 3 is a cross-sectional view of the thermal energy exchanger illustrated in FIG. 2 taken along section line 3-3, wherein a plurality of tubes includes an internal web formed therein;

FIG. 5 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof;

FIG. 6 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof;

FIG. 9 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof, and wherein at least one of the tubes has a pair of substantially parallel flow paths;

FIG. 10 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof, and wherein at least one of the tubes having the phase change material disposed therein is closed by a cover;

FIG. 12 is a fragmentary cross-sectional elevational view of a thermal energy exchanger according to another embodiment of the invention, the section taken along a plane substantially perpendicular to a direction of air flow through the thermal energy exchanger, wherein the thermal energy exchanger includes a plurality of tubes in fluid communication with an upper fluid manifold, a phase change material manifold formed around at least a portion of the tubes, and a secondary phase change material manifold disposed in the upper fluid manifold;

FIG. 13 is a fragmentary cross-sectional elevational view of a thermal energy exchanger according to another embodiment of the invention, the section taken along a plane substantially perpendicular to a direction of air flow through the thermal energy exchanger, wherein the thermal energy exchanger includes a plurality of tubes in fluid communication with an upper fluid manifold, a phase change material manifold formed around at least a portion of the tubes, and a secondary phase change material manifold disposed adjacent an outer surface of the upper fluid manifold;

FIG. 14 is a fragmentary cross-sectional elevational view of a thermal energy exchanger according to another embodiment of the invention, the section taken along a plane substantially perpendicular to a direction of air flow through the thermal energy exchanger, wherein the thermal energy exchanger includes a plurality of tubes in fluid communication with an upper fluid manifold, a phase change material manifold formed around at least a portion of the tubes, and a secondary phase change material manifold disposed around at least a portion of an outer periphery of the thermal energy exchanger; and FIG. 15 is a fragmentary cross-sectional elevational view of a thermal energy exchanger according to another embodiment of the invention, the section taken along a plane substantially perpendicular to a direction of air flow through the thermal energy exchanger, wherein the thermal energy exchanger includes a plurality of first tubes in fluid communication with an upper fluid manifold, a plurality of second tubes in fluid communication with a plurality of phase change material manifolds, and a secondary phase change material manifold disposed around at least a portion of an outer periphery of the thermal energy exchanger.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
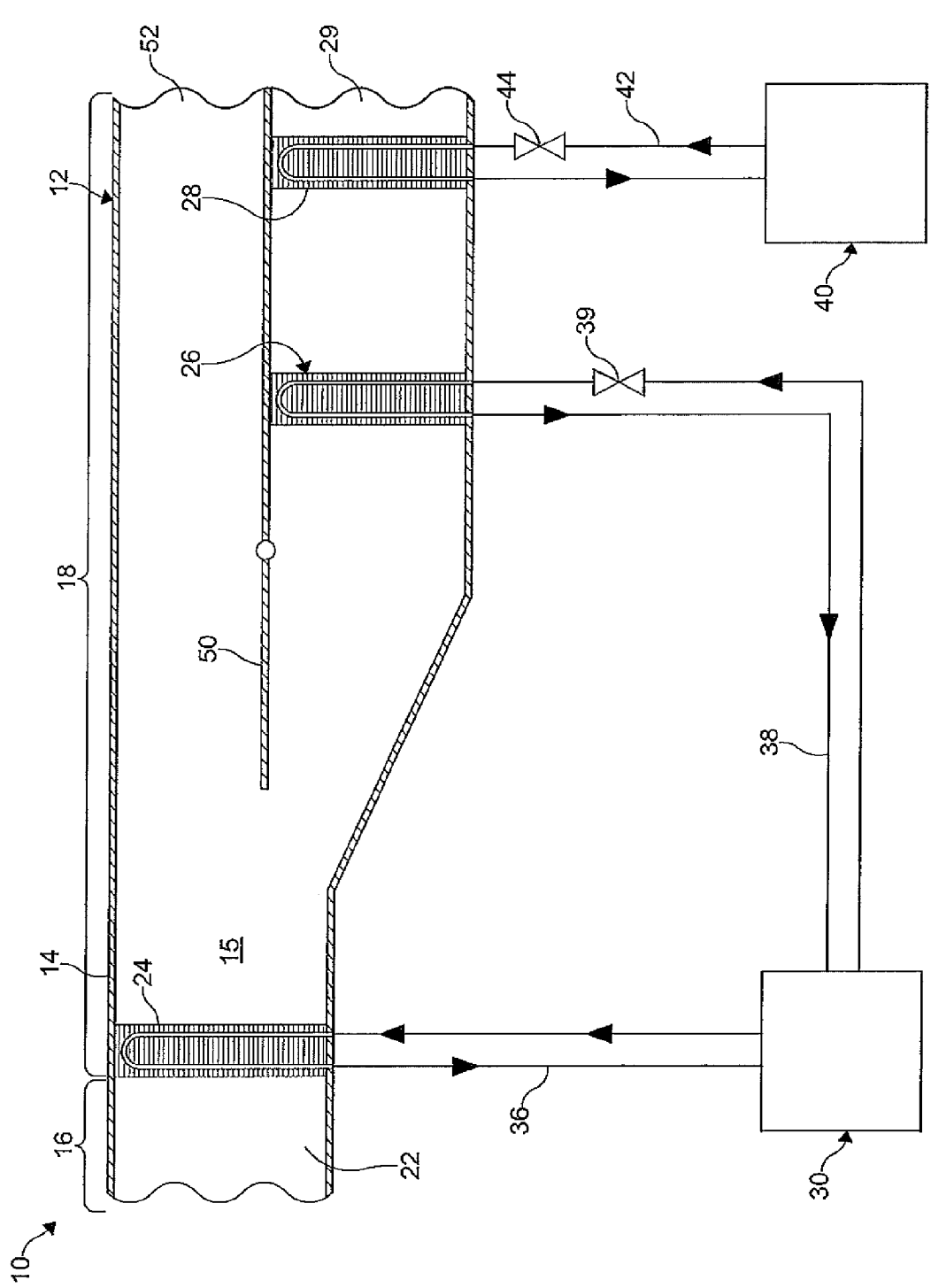
FIG. 1 is a schematic flow diagram of an HVAC system including a fragmentary sectional view of an HVAC module having a thermal energy exchanger disposed therein according to an embodiment of the invention.

FIG. 1 shows a heating, ventilating, and air conditioning (HVAC) system 10 according to an embodiment of the invention. The HVAC system 10 typically provides heating, ventilation, and air conditioning for a passenger compartment of a vehicle (not shown). The HVAC system 10 includes a control module 12 to control at least a temperature of the passenger compartment.

The module 12 illustrated includes a hollow main housing 14 with an air flow conduit 15 formed therein. The housing 14 includes an inlet section 16, a mixing and conditioning section 18, and an outlet and distribution section (not shown). In the embodiment shown, an air inlet 22 is formed in the inlet section 16. The air inlet 22 is in fluid communication with a supply of air (not shown). The supply of air can be provided from outside of the vehicle, recirculated from the passenger compartment of the vehicle, or a mixture of the two, for example. The inlet section 16 is adapted to receive a blower wheel (not shown) therein to cause air to flow through the air inlet 22. A filter (not shown) can be provided upstream or downstream of the inlet section 16 if desired.

The mixing and conditioning section 18 of the housing 14 is adapted to receive an evaporator core 24, a thermal energy exchanger 26, and a heater core 28 therein. A filter (not shown) can also be provided upstream of the evaporator core 24, if desired. The evaporator core 24 is in fluid communication with a source of cooled fluid 30 such as a refrigeration system, for example, through a conduit 36. The source of cooled fluid 30 includes a fluid circulating therein. The fluid absorbs thermal energy and conditions the air flowing through the HVAC module 12.

The thermal energy exchanger 26 can also be in fluid communication with the source of cooled fluid 30 through a conduit 38. A valve 39 can be disposed in the conduit 38 to selectively militate against a flow of the fluid therethrough. The thermal energy exchanger 26 is adapted to absorb thermal energy and cool the air flowing therethrough when a fuel-powered engine of the vehicle is not in operation. The thermal energy exchanger 26 is adapted to receive the fluid from the source of cooled fluid 30 therethrough.

As shown, the heater core 28 is fluidly connected to a source of heated fluid 40 by a conduit 42. The source of heated fluid 40 can be any conventional source of heated fluid such as the fuel-powered engine of the vehicle, for example, and the heated fluid can be any conventional fluid such as an engine coolant, for example. A valve 44 can be disposed in the conduit 42 to selectively militate against a flow of heated fluid therethrough. The heater core 28 is adapted to release thermal energy and heat the air flowing therethrough when the fuel-powered engine of the vehicle is in operation.

In particular embodiments, the thermal energy exchanger 26 and the heater core 28 are disposed in a first passage 29 downstream of a selectively positionable blend door 50. In an engine-off cooling mode of the HVAC system 10, the blend door 50 is positioned in a first position permitting air from the evaporator 24 to only flow into the first passage 29 and through the thermal energy exchanger 26 and the heater core 28. In a pull-down mode of the HVAC system 10, the blend door 50 is positioned in a second position permitting air from the evaporator 24 to only flow into a second passage 52 to bypass the thermal energy exchanger 26 and the heater core 28. In a thermal energy exchanger charge mode of the HVAC system 10, the blend door 50 is positioned in an intermediate position between the first and second positions permitting air from the evaporator 24 to flow into both the first and second passages 29, 52 and through the thermal energy exchanger 26 and the heater core 28.

As illustrated in FIG. 2, the thermal energy exchanger 26 of the embodiment shown is a multi-layer louvered-fin heat exchanger. It is understood that the thermal energy exchanger 26 can be any conventional thermal energy exchanger as desired. In a non-limiting example, the thermal energy exchanger 26 has a first layer 60, a second layer 62, and a third layer 64 arranged substantially perpendicular to an air-flowing direction. Additional or fewer layers than shown can be employed as desired. The layers 60, 62, 64 are arranged so the second layer 62 is disposed downstream of the first layer 60 and upstream of the third layer 64. It is understood, however, that the layers 60, 62, 64 can be arranged as desired. The layers 60, 62, 64 can be bonded together by any suitable method as desired such as brazing and welding, for example.

Each of the layers 60, 62, 64 of the thermal energy exchanger 26 includes an upper first fluid manifold 66, 68, 70 and a lower second fluid manifold 72, 74, 76, respectively. A plurality of first tubes 78 extends between the fluid manifolds 66, 72 of the first layer 60. A plurality of second tubes 80 extends between the fluid manifolds 68, 74 of the second layer 62. A plurality of third tubes 82 extends between the fluid manifolds 70, 76 of the third layer 64. In particular embodiments, each of the first upper fluid manifolds 66, 68, 70 is an inlet manifold which distributes the fluid into at least a portion of the tubes 78, 80, 82 and each of the second lower fluid manifolds 72, 74, 76 is an outlet manifold which collects the fluid from at least a portion of the tubes 78, 80, 82.

Each of the tubes 78, 80, 82 is provided with louvered fins 84 formed thereon. The fins 84 abut an outer surface of the tubes 78, 80, 82 for enhancing thermal energy transfer of the thermal energy exchanger 26. The fins 84 include a plurality of crests 86 formed thereon. The crests 86 are formed substantially parallel to each other and at a substantially 90 degree angle to the tubes 78, 80, 82. It is understood that the crests 86 can be formed at any angle to the tubes 78, 80, 82 if desired. Each of the crests 86 defines an air space 88 extending between the tubes 78, 80, 82 and the fins 84. The tubes 78, 80, 82 of the thermal energy exchanger 26 can further include a plurality of internal fins 89 formed on an inner surface thereof. The internal fins further enhance the transfer of thermal energy of the thermal energy exchanger 26. It is understood, however, that the thermal energy exchanger 26 can be constructed as a finless heat exchanger if desired.

FIGS. 1-3 show a configuration of the thermal energy exchanger 26 according to one embodiment of the invention. Each of the tubes 78 of the first layer 60 includes a passage 90 formed therein. The passage 90 fluidly connects the fluid manifolds 66, 72 and receives the fluid therein. As illustrated in FIG. 3, the second layer 62 includes two sets A, B of the tubes 80, each set A, B having a passage 92 formed therein. The tubes 80 of set A and the tubes 80 of set B are arranged in an alternating pattern. The passage 92 formed in the tubes 80 of set A fluidly connects the fluid manifolds 68, 74 and receives the fluid therein. The passage 92 formed in the tubes 80 of set B includes a phase change material (PCM) 94 disposed therein and is in fluid communication with a PCM manifold 96 shown in FIG. 2. Each of the PCM manifolds 96 extends between a pair of tubes 80 of set A and includes the PCM 94 disposed therein. The PCM manifolds 96 are sealed to militate against leakage of the PCM 94 into the fluid. In certain embodiments, the tubes 80 of set B and the PCM manifolds 96 are filled by heating the PCM 94 above a melting point thereof until the PCM 94 is a liquid which can be easily poured into an opening (not shown) of the PCM manifolds 96. The PCM 94 absorbs thermal energy from the air flowing through the thermal energy exchanger 26 when the fuel-powered engine is not in operation. Accordingly, when the fuel-powered engine of the vehicle is in operation, the PCM 94 releases thermal energy into conditioned air from the evaporator 24 flowing therethrough.

Similarly, the third layer 64 includes two sets C, D of the tubes 82, each set C, D having a passage 98 formed therein. The tubes 82 of set C and the tubes 82 of set D are arranged in an alternating pattern. The passage 98 formed in the tubes 82 of set C fluidly connects the fluid manifolds 70, 76 and receives the fluid therein. The passage 98 formed in the tubes 82 of set D includes a PCM 100 disposed therein and is in fluid communication with a PCM manifold 102. Each of the PCM manifolds 102 extends between a pair of tubes 82 of set C and includes the PCM 100 disposed therein. The PCM manifolds 102 are sealed to militate against leakage of the PCM 100 into the fluid. In certain embodiments, the tubes 82 of set D and the PCM manifolds 102 are filled by heating the PCM 100 above a melting point thereof until the PCM 100 is a liquid which can be easily poured into an opening (not shown) of the PCM manifolds 102.

The PCM 100 absorbs thermal energy from the air flowing through the thermal energy exchanger 26 when the fuel-powered engine is not in operation. Accordingly, when the fuel-powered engine of the vehicle is in operation, the PCM 100 releases thermal energy into conditioned air from the evaporator 24 flowing therethrough. As shown in FIGS. 2 and 3, the tubes 80 of set B are laterally offset with respect of the tubes 82 of set D so the PCM 100 cools to a lower temperature during the thermal energy exchanger charge mode of the HVAC system 10.

Each of the PCMs 94, 100 is any material that melts and solidifies at predetermined temperatures and is capable of storing and releasing thermal energy such as a paraffin wax, an alcohol, water, and any combination thereof, for example. In particular embodiments, the PCMs 94, 100 are different materials of which the melting point of the PCM 94 is higher than the melting point of the PCM 100. For example, the PCM 94 can have a melting point in a range of about 12° C. to about 14° C. and the PCM 100 can have a melting point in a range of about 6° C. to about 9° C. so the third layer 64 can further cool the air which has passed through the second layer 62. It is understood, however, that the PCMs 94, 100 can be the same material if desired. The PCMs 94, 100 can also be impregnated with a thermally conductive material such as graphite powder, for example, to further enhance the transfer of thermal energy.

As shown in FIG. 3, an internal web 104 may be formed in at least one of the tubes 80 of set B and the tubes 82 of set D. The web 104 is formed between opposing walls 106, 108 of the tubes 80, 82 of the respective sets B, D, substantially parallel to a longitudinal axis thereof. The web 104 shown has a substantially hourglass-shaped cross-section arranged substantially perpendicular to the air-flowing direction through the thermal energy exchanger 26. The web 104 enhances thermal energy conduction from the air flowing through the thermal energy exchanger 26 to the PCM 94 disposed in the tubes 80 of set B and the PCM 100 disposed in the tubes 82 of set D.

Figure 4:
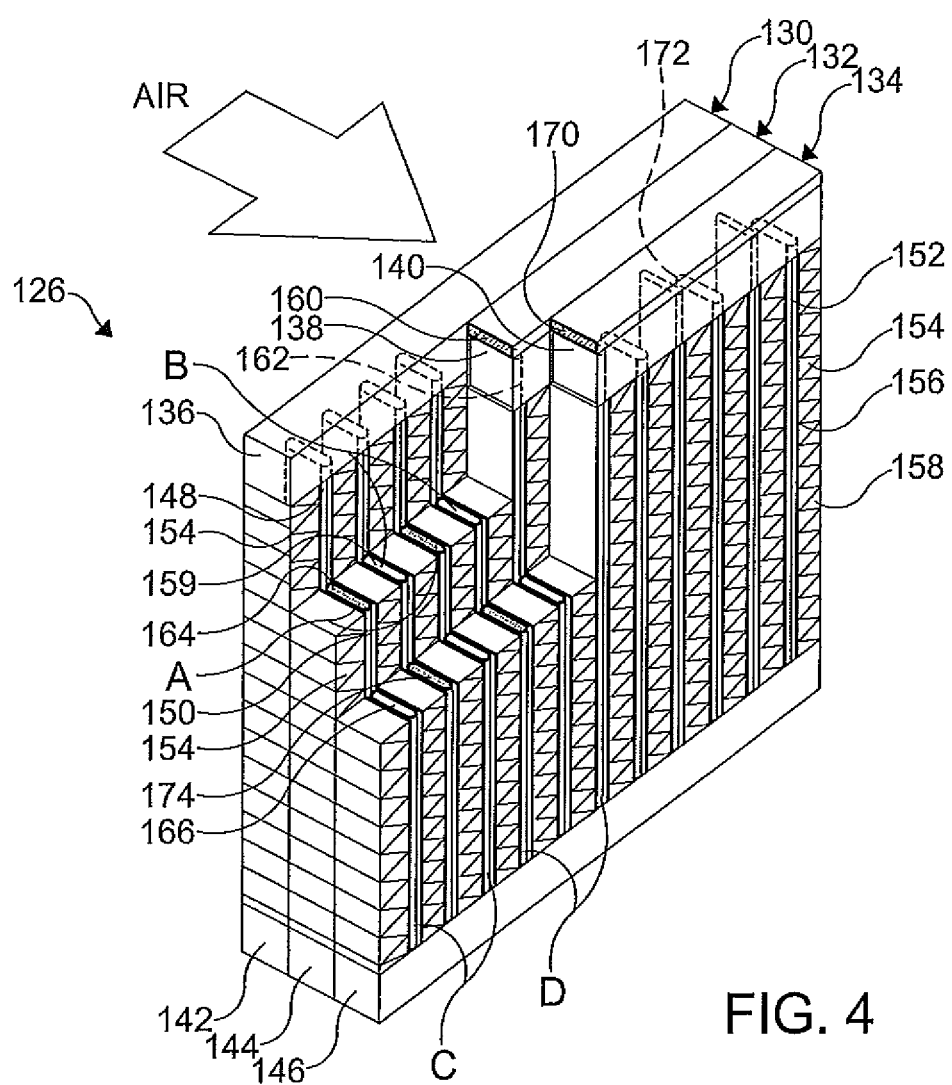
FIG. 4 is a schematic perspective view of the thermal energy exchanger according to another embodiment of the present invention showing a portion of two layers of the thermal energy exchanger cutaway.

FIG. 4 illustrates an alternative configuration of the thermal energy exchanger 26. In FIG. 4, the thermal energy exchanger 126 has a first layer 130, a second layer 132, and a third layer 134 arranged substantially perpendicular to an air-flowing direction. Additional or fewer layers than shown can be employed as desired. The layers 130, 132, 134 are arranged so the second layer 132 is disposed downstream of the first layer 130 and upstream of the third layer 134. It is understood, however, that the layers 130, 132, 134 can be arranged as desired. The layers 130, 132, 134 can be bonded together by any suitable method as desired such as brazing and welding, for example.

Each of the layers 130, 132, 134 of the thermal energy exchanger 126 includes an upper first fluid manifold 136, 138, 140 and a lower second fluid manifold 142, 144, 146, respectively. A plurality of first tubes 148 extends between the fluid manifolds 136, 142 of the first layer 130. A plurality of second tubes 150 extends between the fluid manifolds 138, 144 of the second layer 132. A plurality of third tubes 152 extends between the fluid manifolds 140, 146 of the third layer 134. In particular embodiments, each of the upper first fluid manifolds 136, 138, 140 is an inlet manifold which distributes the fluid into at least a portion of the tubes 148, 150, 152 and each of the lower second fluid manifolds 142, 144, 146 is an outlet manifold which collects the fluid from at least a portion of the tubes 148, 150, 152.

Each of the tubes 148, 150, 152 is provided with louvered fins 154 formed thereon. The fins 154 abut an outer surface of the tubes 148, 150, 152 for enhancing thermal energy transfer of the thermal energy exchanger 126. The fins 154 include a plurality of crests 156 formed thereon. The crests 156 are formed substantially parallel to each other and at a substantially 90 degree angle to the tubes 148, 150, 152. It is understood that the crests 156 can be formed at any angle to the tubes 148, 150, 152 if desired. Each of the crests 156 defines an air space 158 extending between the tubes 148, 150, 152 and the fins 154.

Each of the tubes 148 of the first layer 130 includes a passage (not shown) formed therein. The passage fluidly connects the fluid manifolds 136, 142 and receives the fluid therein. Similar to FIG. 3, the second layer 132 includes two sets A, B of the tubes 150, each set A, B of the tubes 150 having a passage 159 formed therein. The tubes 150 of set A and the tubes 150 of set B are arranged in an alternating pattern. Each of the tubes 150 of set B of the second layer 132 are in fluid communication with an outer PCM manifold 160 through a conduit 162. The conduits 162 shown have a circular cross-sectional shape and a diameter smaller than a diameter of the tubes 150 of set B. As illustrated, the tubes 150 of set B and the PCM manifold 160 includes a PCM 164 disposed therein. The PCM manifold 160 is sealed to militate against leakage of the PCM 164 into the fluid. The tubes 150 of set B are filled by heating the PCM 164 above a melting point thereof until the PCM 164 is a liquid which can be easily poured into an opening (not shown) of the PCM manifold 160. The liquid PCM 164 flows from the PCM manifold 160 through the conduits 162 into the tubes 150 of set B. The PCM 164 absorbs thermal energy from the air flowing through the thermal energy exchanger 126 when the fuel-powered engine is not in operation. Accordingly, when the fuel-powered engine of the vehicle is in operation, the PCM 164 releases thermal energy into conditioned air from the evaporator 24 flowing therethrough.

The third layer 134 includes two sets C, D of the tubes 152, each set C, D of the tubes 152 having a passage 166 formed therein. The tubes 152 of set C and the tubes 152 of set D are arranged in an alternating pattern. Each of the tubes 152 of set D of the third layer 134 are in fluid communication with an outer PCM manifold 170 through a conduit 172. The conduits 172 shown have a substantially oval cross-sectional shape and a diameter smaller than a diameter of the tubes 152 of set D. It is understood, however, that the conduits 172 can have any shape and size as desired. As illustrated, the tubes 152 of set D and the PCM manifold 170 includes a PCM 174 disposed therein. The PCM manifold 170 is sealed to militate against leakage of the PCM 174 into the fluid. The tubes 152 of set D are filled by heating the PCM 174 above a melting point thereof until the PCM 174 is a liquid which can be easily poured into an opening (not shown) of the PCM manifold 170. The liquid PCM 174 flows from the PCM manifold 170 through the conduits 172 into the tubes 152 of set D. It is understood that the PCM manifold 170 and the PCM manifold 160 can be integrally formed if desired.

The PCM 174 absorbs thermal energy from the air flowing through the thermal energy exchanger 126 when the fuel-powered engine is not in operation. Accordingly, when the fuel-powered engine of the vehicle is in operation, the PCM 174 releases thermal energy into conditioned air from the evaporator flowing therethrough. As shown, the tubes 150 of set B are laterally offset with respect of the tubes 152 of set D so the PCM 174 cools to a lower temperature during the thermal energy exchanger charge mode of the HVAC system 10.

Each of the PCMs 164, 174 is any material that melts and solidifies at predetermined temperatures and is capable of storing and releasing thermal energy such as a paraffin wax, an alcohol, water, and any combination thereof, for example. In particular embodiments, the PCMs 164, 174 are different materials of which the melting point of the PCM 164 is higher than the melting point of the PCM 174. For example, the PCM 164 can have a melting point in a range of about 12° C. to about 14° C. and the PCM 174 can have a melting point in a range of about 6° C. to about 9° C. so the third layer 134 can further cool the air which has passed through the second layer 132. It is understood, however, that the PCMs 164, 174 can be the same material if desired. The PCMs 164, 174 can also be impregnated with a thermally conductive material such as graphite powder, for example, to further enhance the transfer of thermal energy.

An internal web (not shown) similar to the web 104 in FIG. 3 may be formed in at least one of the tubes 150 of set B and the tubes 152 of set D to enhance thermal energy conduction from the air flowing through the thermal energy exchanger 126 to the PCM 164 disposed in the tubes 150 of set B and the PCM 174 disposed in the tubes 152 of set D.

Alternatively, at least one of the tubes 148, 150, 152 of the thermal energy exchanger 126 can further include a plurality of internal fins (not shown) similar to the fins 89 in FIG. 2 formed on an inner surface thereof. The internal fins further enhance the transfer of thermal energy of the thermal energy exchanger 126. It is understood, however, that the thermal energy exchanger 126 can be constructed as a finless heat exchanger if desired.

The remaining structure of the HVAC system 10 is substantially the same as described above for the embodiment illustrated in FIGS. 1-3.

FIG. 5 illustrates an alternative configuration of the thermal energy exchanger 26. In FIG. 5, the thermal energy exchanger 226 has a first layer 230, a second layer 232, and a third layer 234 arranged substantially perpendicular to an air-flowing direction. Additional or fewer layers than shown can be employed as desired. The layers 230, 232, 234 are arranged so the second layer 232 is disposed downstream of the first layer 230 and upstream of the third layer 234. It is understood, however, that the layers 230, 232, 234 can be arranged as desired. The layers 230, 232, 234 can be bonded together by any suitable method as desired such as brazing and welding, for example.

Each of the layers 230, 232, 234 of the thermal energy exchanger 226 includes an upper divided manifold 236, 238, 240 and a lower fluid manifold 242, 244, 246, respectively. A plurality of first tubes 248 extends between the manifolds 236, 242 of the first layer 230. A plurality of second tubes 250 extends between the manifolds 238, 244 of the second layer 232. A plurality of third tubes 252 extends between the manifolds 240, 246 of the third layer 234. In certain embodiments, each of the tubes 248, 250, 252 is provided with louvered fins (not shown) formed thereon. The fins abut an outer surface of the tubes 248, 250, 252 for enhancing thermal energy transfer of the thermal energy exchanger 226.

As shown, each of the tubes 248 of the first layer 230 is a divided tube having a first portion 260 and a second portion 262. The portions 260, 262 are formed substantially parallel to a longitudinal axis of the tubes 248 and arranged so the first portion 260 is positioned upstream of the second portion 262 in respect of the air-flowing direction. Each of the portions 260, 262 includes a passage 264 formed therein. The passage 264 formed in the first portion 260 of the tubes 248 fluidly connects a first portion 266 of the divided manifold 236 and the fluid manifold 242. The first portion 266 of the divided manifold 236, the first portion 260 of the tubes 248, and the fluid manifold 242 receive the fluid therein. In particular embodiments, the first portion 266 of the divided manifold 236 is an inlet manifold which distributes the fluid into the first portion 260 of the tubes 248 and the fluid manifold 242 is an outlet manifold which collects the fluid from the first portion 266 of the tubes 248. The passage 264 formed in the second portion 262 of the tubes 248 is in fluid communication with a second portion 268 of the divided manifold 236. The second portion 262 of the tubes 248 and the second portion 268 of the divided manifold 236 include a PCM 269 disposed therein.

Each of the tubes 250 of the second layer 232 is a divided tube having a first portion 270 and a second portion 272. The portions 270, 272 are formed substantially parallel to a longitudinal axis of the tubes 250 and arranged so the first portion 270 is positioned upstream of the second portion 272 in respect of the air-flowing direction. Each of the portions 270, 272 includes a passage 274 formed therein. The passage 274 formed in the first portion 270 of the tubes 250 fluidly connects a first portion 276 of the divided manifold 238 and the fluid manifold 244. The first portion 276 of the divided manifold 238, the first portion 270 of the tubes 250, and the fluid manifold 244 receive the fluid therein. In particular embodiments, the first portion 276 of the divided manifold 238 is an inlet manifold which distributes the fluid into the first portion 270 of the tubes 250 and the fluid manifold 244 is an outlet manifold which collects the fluid from the first portion 276 of the tubes 250. The passage 274 formed in the second portion 272 of the tubes 250 is in fluid communication with a second portion 278 of the divided manifold 238. The second portion 272 of the tubes 250 and the second portion 278 of the divided manifold 238 include a PCM 279 disposed therein.

Each of the tubes 252 of the third layer 234 is a divided tube having a first portion 280 and a second portion 282. The portions 280, 282 are formed substantially parallel to a longitudinal axis of the tubes 252 and arranged so the first portion 280 is positioned upstream of the second portion 282 in respect of the air-flowing direction. Each of the portions 280, 282 includes a passage 284 formed therein. The passage 284 formed in the first portion 280 of the tubes 252 fluidly connects a first portion 286 of the divided manifold 240 and the fluid manifold 246. The first portion 286 of the divided manifold 240, the first portion 280 of the tubes 252, and the fluid manifold 246 receive the fluid therein. In particular embodiments, the first portion 286 of the divided manifold 240 is an inlet manifold which distributes the fluid into the first portion 280 of the tubes 252 and the fluid manifold 246 is an outlet manifold which collects the fluid from the first portion 286 of the tubes 252. The passage 284 formed in the second portion 282 of the tubes 252 is in fluid communication with a second portion 288 of the divided manifold 240. The second portion 282 of the tubes 252 and the second portion 288 of the divided manifold 240 include a PCM 289 disposed therein.

Each of the PCMs 269, 279, 289 is any material that melts and solidifies at predetermined temperatures and is capable of storing and releasing thermal energy such as a paraffin wax, an alcohol, water, and any combination thereof, for example. In particular embodiments, the PCMs 269, 279, 289 are different materials of which the melting point of the PCM 279 is higher than the melting point of the PCM 269 and the melting point of the PCM 289 is higher than the melting points of the PCMs 269, 279 so the second layer 232 can further cool the air which has pass through the first layer 230 and the third layer 234 can further cool the air which has passed through the first and second layers 230, 232. It is understood, however, that the PCMs 269, 279, 289 can be the same material if desired. The PCMs 269, 279, 289 can also be impregnated with a thermally conductive material such as graphite powder, for example, to further enhance the transfer of thermal energy.

An internal web (not shown) similar to the web 104 in FIG. 3 may be formed in at least one of the second portions 262, 272, 282 of the tubes 248, 250, 252, respectively, to enhance thermal energy conduction from the air flowing through the thermal energy exchanger 226. Alternatively, at least one of the second portions 262, 272, 282 of the tubes 248, 250, 252 can further include a plurality of internal fins (not shown) similar to the fins 89 in FIG. 2 formed on an inner surface thereof. The internal fins further enhance the transfer of thermal energy of the thermal energy exchanger 226.

The remaining structure of the HVAC system 10 is substantially the same as described above for the embodiments illustrated in FIGS. 1-4.

FIG. 6 illustrates an alternative configuration of the thermal energy exchanger 26. In FIG. 6, the thermal energy exchanger 326 has a first layer 330, a second layer 332, and a third layer 334 arranged substantially perpendicular to an air-flowing direction. Additional or fewer layers than shown can be employed as desired. The layers 330, 332, 334 are arranged so the second layer 332 is disposed downstream of the first layer 330 and upstream of the third layer 334. It is understood, however, that the layers 330, 332, 334 can be arranged as desired. The layers 330, 332, 334 can be bonded together by any suitable method as desired such as brazing and welding, for example.

The first layer 330 of the thermal energy exchanger 326 includes an upper first divided manifold 336 and a lower fluid manifold 342. Each of the second layer 332 and the third layer 334 of the thermal energy exchanger 326 includes an upper first divided manifold 338, 340 and a lower second divided manifold 344, 346, respectively. A plurality of first tubes 348 extends between the manifolds 336, 342 of the first layer 330. A plurality of second tubes 350 extends between the manifolds 338, 344 of the second layer 332. A plurality of third tubes 352 extends between the manifolds 340, 346 of the third layer 334. In certain embodiments, each of the tubes 348, 350, 352 is provided with louvered fins (not shown) formed thereon. The fins abut an outer surface of the tubes 348, 350, 352 for enhancing thermal energy transfer of the thermal energy exchanger 326.

As shown, each of the tubes 348 of the first layer 330 is a divided tube having a first portion 360 and a second portion 362. The portions 360, 362 are formed substantially parallel to a longitudinal axis of the tubes 348 and arranged so the first portion 360 is positioned upstream of the second portion 362 in respect of the air-flowing direction. Each of the portions 360, 362 includes a passage 364 formed therein. The passage 364 formed in the first portion 360 of the tubes 348 fluidly connects a first portion 366 of the divided manifold 336 and the fluid manifold 342. The first portion 366 of the divided manifold 336, the first portion 360 of the tubes 348, and the fluid manifold 342 receive the fluid therein. In particular embodiments, the first portion 366 of the divided manifold 336 is an inlet manifold which distributes the fluid into the first portion 360 of the tubes 348 and the fluid manifold 342 is an outlet manifold which collects the fluid from the first portion 360 of the tubes 348. The passage 364 formed in the second portion 362 of the tubes 348 is in fluid communication with a second portion 368 of the divided manifold 336. The second portion 362 of the tubes 348 and the second portion 368 of the divided manifold 336 include a PCM 369 disposed therein. As shown, a volume of the second portion 368 of the divided manifold 336 is about one-fourth a volume of the first portion 366 of the divided manifold 336.

Each of the tubes 350 of the second layer 332 is a divided tube having a first portion 370 and a second portion 372. The portions 370, 372 are formed substantially parallel to a longitudinal axis of the tubes 350 and arranged so the first portion 370 is positioned upstream of the second portion 372 in respect of the air-flowing direction. Each of the portions 370, 372 includes a passage 374 formed therein. The passage 374 formed in the first portion 370 of the tubes 350 fluidly connects a first portion 376 of the first divided manifold 338 and a first portion 377 of the second divided manifold 344. The first portions 376, 377 of the divided manifolds 338, 344 and the first portion 370 of the tubes 350 receive the fluid therein. In particular embodiments, the first portion 376 of the first divided manifold 338 is an inlet manifold which distributes the fluid into the first portion 370 of the tubes 350 and the first portion 377 of the second divided manifold 344 is an outlet manifold which collects the fluid from the first portion 370 of the tubes 350. The passage 374 formed in the second portion 372 of the tubes 350 fluidly connects a second portion 378 of the first divided manifold 338 and a second portion 379 of the second divided manifold 344. The second portions 378, 379 of the divided manifolds 338, 344 and the second portion 372 of the tubes 350 include a PCM 380 disposed therein. As shown, a volume of the second portion 378 of the first divided manifold 338 is about one-half a volume of the first portion 376 of the first divided manifold 338. A volume of the second portion 379 of the second divided manifold 344 is about one-fourth a volume of the first portion 377 of the second divided manifold 344.

Each of the tubes 352 of the third layer 334 is a divided tube having a first portion 381 and a second portion 382. The portions 381, 382 are formed substantially parallel to a longitudinal axis of the tubes 352 and arranged so the first portion 381 is positioned upstream of the second portion 382 in respect of the air-flowing direction. Each of the portions 381, 382 includes a passage 384 formed therein. The passage 384 formed in the first portion 381 of the tubes 352 fluidly connects a first portion 386 of the first divided manifold 340 and a first portion 387 of the second divided manifold 346. The first portions 386, 387 of the divided manifolds 340, 346 and the first portion 381 of the tubes 352 receive the fluid therein. In particular embodiments, the first portion 386 of the first divided manifold 340 is an inlet manifold which distributes the fluid into the first portion 381 of the tubes 352 and the first portion 387 of the second divided manifold 346 is an outlet manifold which collects the fluid from the first portion 381 of the tubes 352. The passage 384 formed in the second portion 382 of the tubes 352 fluidly connects a second portion 388 of the first divided manifold 340 and a second portion 389 of the second divided manifold 346. The second portions 388, 389 of the divided manifolds 340, 346 and the second portion 382 of the tubes 352 include a PCM 390 disposed therein. As shown, a volume of the second portion 388 of the first divided manifold 340 is about one-half a volume of the first portion 386 of the first divided manifold 340. A volume of the second portion 389 of the second divided manifold 346 is about one-half a volume of the first portion 387 of the second divided manifold 346.

Each of the PCMs 369, 380, 390 is any material that melts and solidifies at predetermined temperatures and is capable of storing and releasing thermal energy such as a paraffin wax, an alcohol, water, and any combination thereof, for example. In particular embodiments, the PCMs 369, 380, 390 are different materials of which the melting point of the PCM 380 is higher than the melting point of the PCM 369 and the melting point of the PCM 390 is higher than the melting points of the PCMs 369, 380 so the second layer 332 can further cool the air which has passed through the first layer 330 and the third layer 334 can further cool the air which has passed through the first and second layers 330, 332. It is understood, however, that the PCMs 369, 380, 390 can be the same material if desired. The PCMs 369, 380, 390 can also be impregnated with a thermally conductive material such as graphite powder, for example, to further enhance the transfer of thermal energy.

An internal web (not shown) similar to the web 104 in FIG. 3 may be formed in at least one of the second portions 362, 372, 382 of the tubes 348, 350, 352, respectively, to enhance thermal energy conduction from the air flowing through the thermal energy exchanger 326. Alternatively, at least one of the second portions 362, 372, 382 of the tubes 348, 350, 352 can further include a plurality of internal fins (not shown) similar to the fins 89 in FIG. 2 formed on an inner surface thereof. The internal fins further enhance the transfer of thermal energy of the thermal energy exchanger 326.

The remaining structure of the HVAC system 10 is substantially the same as described above for the embodiments illustrated in FIGS. 1-5.

Figure 7:
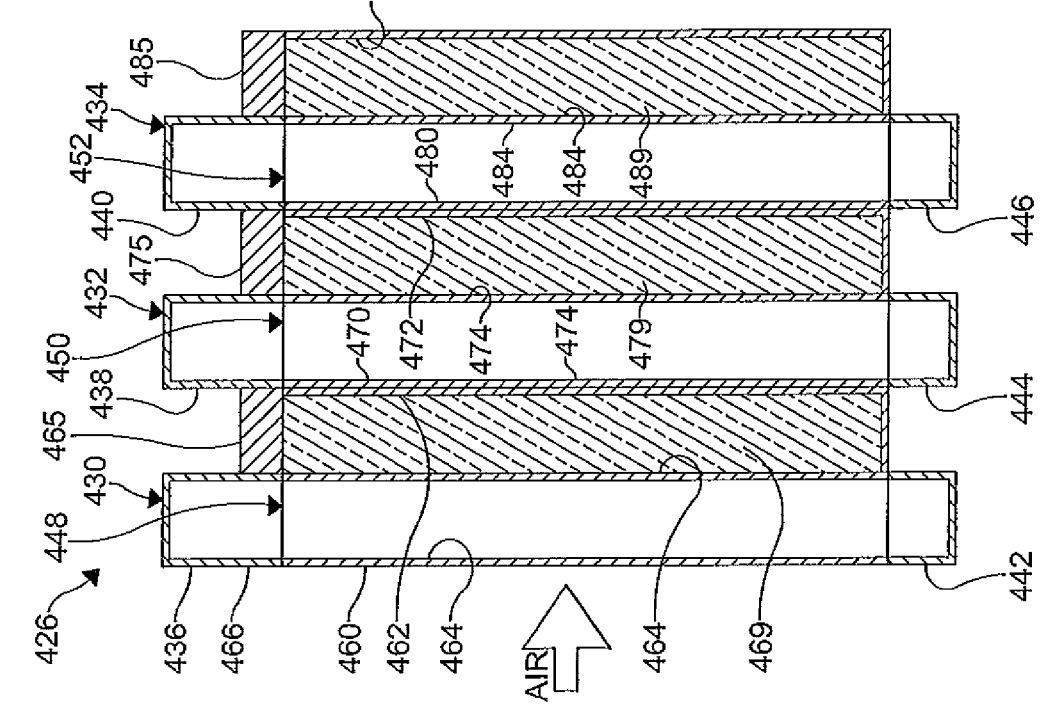
FIG. 7 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof.

FIG. 7 illustrates an alternative configuration of the thermal energy exchanger 426. In FIG. 7, the thermal energy exchanger 426 has a first layer 430, a second layer 432, and a third layer 434 arranged substantially perpendicular to an air-flowing direction. Additional or fewer layers than shown can be employed as desired. The layers 430, 432, 434 are arranged so the second layer 432 is disposed downstream of the first layer 430 and upstream of the third layer 434. It is understood, however, that the layers 430, 432, 434 can be arranged as desired. The layers 430, 432, 434 can be bonded together by any suitable method as desired such as brazing and welding, for example.

Each of the layers 430, 432, 434 of the thermal energy exchanger 426 includes an upper first fluid manifold 436, 438, 440 and a lower second fluid manifold 442, 444, 446, respectively. A plurality of first tubes 448 extends between the fluid manifolds 436, 442 of the first layer 430. A plurality of second tubes 450 extends between the fluid manifolds 438, 444 of the second layer 432. A plurality of third tubes 452 extends between the fluid manifolds 440, 446 of the third layer 434. In certain embodiments, each of the tubes 448, 450, 452 is provided with louvered fins (not shown) formed thereon. The fins abut an outer surface of the tubes 448, 450, 452 for enhancing thermal energy transfer of the thermal energy exchanger 426.

As shown, each of the tubes 448 of the first layer 430 is a divided tube having a first portion 460 and a second portion 462. The portions 460, 462 are formed substantially parallel to a longitudinal axis of the tubes 448 and arranged so the first portion 460 is positioned upstream of the second portion 462 in respect of the air-flowing direction. Each of the portions 460, 462 includes a passage 464 formed therein. The passage 464 formed in the first portion 460 of the tubes 448 fluidly connects the first fluid manifold 436 and the second fluid manifold 442. The first portion 460 of the tubes 448 and the fluid manifolds 436, 442 receive the fluid therein. In particular embodiments, the first fluid manifold 436 is an inlet manifold which distributes the fluid into the first portion 460 of the tubes 448 and the second fluid manifold 442 is an outlet manifold which collects the fluid from the first portion 460 of the tubes 448. The passage 464 formed in the second portion 462 of the tubes 448 is closed by a cover 465. As shown, the second portion 462 of the tubes 448 includes a PCM 469 disposed therein.

Each of the tubes 450 of the second layer 432 is a divided tube having a first portion 470 and a second portion 472. The portions 470, 472 are formed substantially parallel to a longitudinal axis of the tubes 450 and arranged so the first portion 470 is positioned upstream of the second portion 472 in respect of the air-flowing direction. Each of the portions 470, 472 includes a passage 474 formed therein. The passage 474 formed in the first portion 470 of the tubes 450 fluidly connects the first fluid manifold 438 and the second fluid manifold 444. The first portion 470 of the tubes 450 and the fluid manifolds 438, 444 receive the fluid therein. In particular embodiments, the first fluid manifold 438 is an inlet manifold which distributes the fluid into the first portion 470 of the tubes 450 and the second fluid manifold 444 is an outlet manifold which collects the fluid from the first portion 470 of the tubes 450. The passage 474 formed in the second portion 472 of the tubes 450 is closed by a cover 475. The second portion 472 of the tubes 450 include a PCM 479 disposed therein.

Each of the tubes 452 of the third layer 434 is a divided tube having a first portion 480 and a second portion 482. The portions 480, 482 are formed substantially parallel to a longitudinal axis of the tubes 452 and arranged so the first portion 480 is positioned upstream of the second portion 482 in respect of the air-flowing direction. Each of the portions 480, 482 includes a passage 484 formed therein. The passage 484 formed in the first portion 480 of the tubes 452 fluidly connects the first fluid manifold 440 and the second fluid manifold 446. The first portion 480 of the tubes 452 and the fluid manifolds 440, 446 receive the fluid therein. In particular embodiments, the first fluid manifold 440 is an inlet manifold which distributes the fluid into the first portion 480 of the tubes 452 and the second fluid manifold 446 is an outlet manifold which collects the fluid from the first portion 480 of the tubes 452. The passage 484 formed in the second portion 482 of the tubes 452 is closed by a cover 485. The second portion 482 of the tubes 452 include a PCM 489 disposed therein.

Each of the PCMs 469, 479, 489 is any material that melts and solidifies at predetermined temperatures and is capable of storing and releasing thermal energy such as a paraffin wax, an alcohol, water, and any combination thereof, for example. In particular embodiments, the PCMs 469, 479, 489 are different materials of which the melting point of the PCM 479 is higher than the melting point of the PCM 469 and the melting point of the PCM 489 is higher than the melting points of the PCMs 469, 479 so the second layer 432 can further cool the air which has pass through the first layer 430 and the third layer 434 can further cool the air which has passed through the first and second layers 430, 432. It is understood, however, that the PCMs 469, 479, 489 can be the same material if desired. The PCMs 469, 479, 489 can also be impregnated with a thermally conductive material such as graphite powder, for example, to further enhance the transfer of thermal energy.

An internal web (not shown) similar to the web 104 in FIG. 3 may be formed in at least one of the second portions 462, 472, 482 of the tubes 448, 450, 452, respectively, to enhance thermal energy conduction from the air flowing through the thermal energy exchanger 426. Alternatively, at least one of the second portions 462, 472, 482 of the tubes 448, 450, 452 can further include a plurality of internal fins (not shown) similar to the fins 89 in FIG. 2 formed on an inner surface thereof. The internal fins further enhance the transfer of thermal energy of the thermal energy exchanger 426.

The remaining structure of the HVAC system 10 is substantially the same as described above for the embodiments illustrated in FIGS. 1-6.

Figure 8:
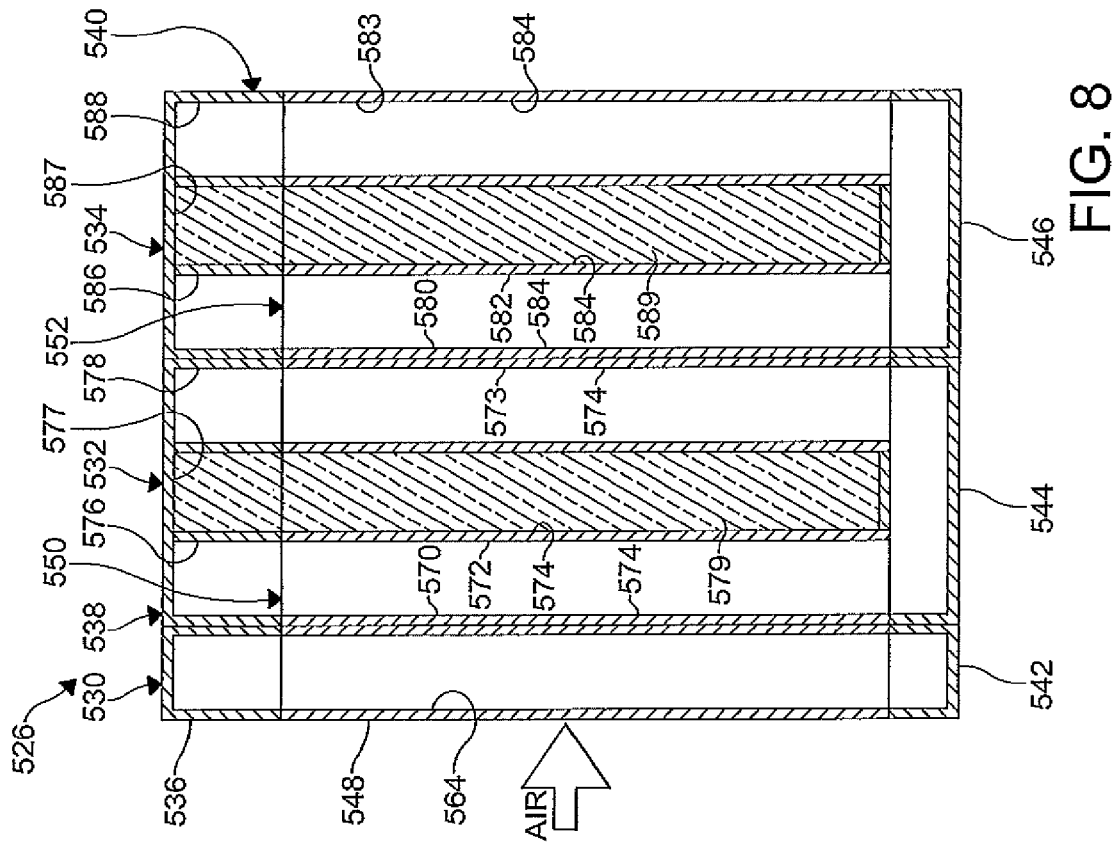
FIG. 8 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof, and wherein at least one of the tubes has a substantially U-shaped flow path.

FIG. 8 illustrates an alternative configuration of the thermal energy exchanger 26. In FIG. 8, the thermal energy exchanger 526 has a first layer 530, a second layer 532, and a third layer 534 arranged substantially perpendicular to an air-flowing direction. Additional or fewer layers than shown can be employed as desired. The layers 530, 532, 534 are arranged so the second layer 532 is disposed downstream of the first layer 530 and upstream of the third layer 534. It is understood, however, that the layers 530, 532, 534 can be arranged as desired. The layers 530, 532, 534 can be bonded together by any suitable method as desired such as brazing and welding, for example.

The first layer 530 of the thermal energy exchanger 526 includes an upper first fluid manifold 536 and a lower second fluid manifold 542. Each of the layers 532, 534 of the thermal energy exchanger 526 includes an upper divided manifold 538, 540 and a lower fluid manifold 544, 546, respectively. A plurality of first tubes 548 extends between the manifolds 536, 542 of the first layer 530. A plurality of second tubes 550 extends between the manifolds 538, 544 of the second layer 532. A plurality of third tubes 552 extends between the manifolds 540, 546 of the third layer 534. In certain embodiments, each of the tubes 548, 550, 552 is provided with louvered fins (not shown) formed thereon. The fins abut an outer surface of the tubes 548, 550, 552 for enhancing thermal energy transfer of the thermal energy exchanger 526.

As shown, each of the tubes 548 of the first layer 530 includes a passage 564 formed therein. The passage 564 of the tubes 548 fluidly connects the fluid manifolds 536, 542 for receiving the fluid therein. In particular embodiments, the first fluid manifold 536 is an inlet manifold which distributes the fluid into the tubes 548 and the second fluid manifold 542 is an outlet manifold which collects the fluid from the tubes 548.

Each of the tubes 550 of the second layer 532 is a divided tube having a first portion 570, a second portion 572, and a third portion 573. The portions 570, 572, 573 are formed substantially parallel to a longitudinal axis of the tubes 550 and arranged so the second portion 572 is positioned downstream of the first portion 570 and upstream of the third portion 573 in respect of the air-flowing direction. Each of the portions 570, 572, 573 includes a passage 574 formed therein. The passage 574 formed in the first and third portions 570, 573 of the tubes 550 fluidly connects a first and a second portion 576, 578, respectively, of the divided manifold 538 and the fluid manifold 544 to form a U-shaped flow path. The first and second portions 576, 578 of the divided manifold 538, the first and third portions 570, 573 of the tubes 550, and the fluid manifold 544 receive the fluid therein. In particular embodiments, the first portion 576 of the divided manifold 538 is an inlet manifold which distributes the fluid into the first and third portions 570, 573 of the tubes 550 and the second portion 578 of the divided manifold 538 is an outlet manifold which collects the fluid from the first and third portions 570, 573 of the tubes 550. The passage 574 formed in the second portion 572 of the tubes 550 is in fluid communication with a third portion 577 of the divided manifold 538. The second portion 572 of the tubes 550 and the third portion 577 of the divided manifold 538 include a PCM 579 disposed therein. As shown, a volume of the third portion 577 of the first divided manifold 538 is about one-half a combined volume of the first and second portions 576, 578 of the first divided manifold 538.

Each of the tubes 552 of the third layer 534 is a divided tube having a first portion 580, a second portion 582, and a third portion 583. The portions 580, 582, 583 are formed substantially parallel to a longitudinal axis of the tubes 552 and arranged so the second portion 582 is positioned downstream of the first portion 580 and upstream of the third portion 583 in respect of the air-flowing direction. Each of the portions 580, 582, 583 includes a passage 584 formed therein. The passage 584 formed in the first and third portions 580, 583 of the tubes 552 fluidly connects a first and a second portion 586, 588, respectively, of the divided manifold 540 and the fluid manifold 546 to form a U-shaped flow path. The first and second portions 586, 588 of the divided manifold 540, the first and third portions 580, 583 of the tubes 552, and the fluid manifold 546 receive the fluid therein. In particular embodiments, the first portion 586 of the divided manifold 540 is an inlet manifold which distributes the fluid into the first and third portions 580, 583 of the tubes 552 and the second portion 588 of the divided manifold 540 is an outlet manifold which collects the fluid from the first and third portions 580, 583 of the tubes 552. The passage 584 formed in the second portion 582 of the tubes 552 is in fluid communication with a third portion 587 of the divided manifold 540. The second portion 582 of the tubes 552 and the third portion 587 of the divided manifold 540 include a PCM 589 disposed therein. As shown, a volume of the third portion 587 of the first divided manifold 540 is about one-half a combined volume of the first and second portions 586, 588 of the first divided manifold 540.

Each of the PCMs 579, 589 is any material that melts and solidifies at predetermined temperatures and is capable of storing and releasing thermal energy such as a paraffin wax, an alcohol, water, and any combination thereof, for example. In particular embodiments, the PCMs 579, 589 are different materials of which the melting point of the PCM 589 is higher than the melting point of the PCM 579 so the third layer 534 can further cool the air which has passed through the second layer 532. It is understood, however, that the PCMs 579, 589 can be the same material if desired. The PCMs 579, 589 can also be impregnated with a thermally conductive material such as graphite powder, for example, to further enhance the transfer of thermal energy.

An internal web (not shown) similar to the web 104 in FIG. 3 may be formed in at least one of the second portions 572, 582 of the tubes 550, 552, respectively, to enhance thermal energy conduction from the air flowing through the thermal energy exchanger 526. Alternatively, at least one of the second portions 572, 582 of the tubes 550, 552 can further include a plurality of internal fins (not shown) similar to the fins 89 in FIG. 2 formed on an inner surface thereof. The internal fins further enhance the transfer of thermal energy of the thermal energy exchanger 526.

The remaining structure of the HVAC system 10 is substantially the same as described above for the embodiments illustrated in FIGS. 1-7.

FIG. 9 illustrates an alternative configuration of the thermal energy exchanger 26. In FIG. 9, the thermal energy exchanger 626 has a first layer 630, a second layer 632, and a third layer 634 arranged substantially perpendicular to an air-flowing direction. Additional or fewer layers than shown can be employed as desired. The layers 630, 632, 634 are arranged so the second layer 632 is disposed downstream of the first layer 630 and upstream of the third layer 634. It is understood, however, that the layers 630, 632, 634 can be arranged as desired. The layers 630, 632, 634 can be bonded together by any suitable method as desired such as brazing and welding, for example.

The first layer 630 of the thermal energy exchanger 626 includes an upper fluid manifold 636 and a lower fluid manifold 642. The second layer 632 of the thermal energy exchanger 626 includes an upper first divided manifold 638 and a lower second divided manifold 644. The third layer 634 of the thermal energy exchanger 626 includes an upper divided manifold 640 and a lower fluid manifold 646. A plurality of first tubes 648 extends between the manifolds 636, 642 of the first layer 630. A plurality of second tubes 650 extends between the manifolds 638, 644 of the second layer 632. A plurality of third tubes 652 extends between the manifolds 640, 646 of the third layer 634. In certain embodiments, each of the tubes 648, 650, 652 is provided with louvered fins (not shown) formed thereon. The fins abut an outer surface of the tubes 648, 650, 652 for enhancing thermal energy transfer of the thermal energy exchanger 626.

As shown, each of the tubes 648 of the first layer 630 includes a passage 664 formed therein. The passage 664 of the tubes 648 fluidly connects the fluid manifolds 636, 642 for receiving the fluid therein. In particular embodiments, the fluid manifold 636 is an inlet manifold which distributes the fluid into the tubes 648 and the fluid manifold 642 is an outlet manifold which collects the fluid from the tubes 648.

Each of the tubes 650 of the second layer 632 is a divided tube having a first portion 670, a second portion 672, and a third portion 673. The portions 670, 672, 673 are formed substantially parallel to a longitudinal axis of the tubes 650 and arranged so the second portion 672 is positioned downstream of the first portion 670 and upstream of the third portion 673 in respect of the air-flowing direction. Each of the portions 670, 672, 673 includes a passage 674 formed therein. The passage 674 formed in the first and third portions 670, 673 of the tubes 650 fluidly connects a first portion 675 of the first divided manifold 638 and a first portion 676 of the second divided manifold 644 to form a pair of parallel flow paths. The first portions 675, 676 of the divided manifolds 638, 644 and the first and third portions 670, 673 of the tubes 650 receive the fluid therein. In particular embodiments, the first portion 675 of the first divided manifold 638 is an inlet manifold which distributes the fluid into the first and third portions 670, 673 of the tubes 650 and the first portion 676 of the second divided manifold 644 is an outlet manifold which collects the fluid from the first and third portions 670, 673 of the tubes 650. The passage 674 formed in the second portion 672 of the tubes 650 fluidly connects a second portion 677 of the first divided manifold 638 and a first portion 678 of the second divided manifold 644. The second portion 672 of the tubes 650 and the second portions 677, 678 of the divided manifolds 638, 644 include a PCM 679 disposed therein. As shown, a volume of the second portion 677 of the first divided manifold 638 is about one-half a volume of the first portion 675 of the first divided manifold 638. A volume of the second portion 678 of the second divided manifold 644 is about one-half a volume of the first portion 676 of the second divided manifold 644.

Each of the tubes 652 of the third layer 634 is a divided tube having a first portion 680, a second portion 682, and a third portion 683. The portions 680, 682, 683 are formed substantially parallel to a longitudinal axis of the tubes 652 and arranged so the second portion 682 is positioned downstream of the first portion 680 and upstream of the third portion 683 in respect of the air-flowing direction. Each of the portions 680, 682, 683 includes a passage 684 formed therein. The passage 684 formed in the first and third portions 680, 683 of the tubes 652 fluidly connects a first and a second portion 686, 688, respectively, of the divided manifold 640 and the fluid manifold 646 to form a U-shaped flow path. The first and second portions 686, 688 of the divided manifold 640, the first and third portions 680, 683 of the tubes 652, and the fluid manifold 646 receive the fluid therein. In particular embodiments, the first portion 686 of the divided manifold 640 is an inlet manifold which distributes the fluid into the first and third portions 680, 683 of the tubes 652 and the second portion 688 of the divided manifold 640 is an outlet manifold which collects the fluid from the first and third portions 680, 683 of the tubes 652. The passage 684 formed in the second portion 682 of the tubes 652 is in fluid communication with a third portion 687 of the divided manifold 640. The second portion 682 of the tubes 652 and the third portion 687 of the divided manifold 640 include a PCM 689 disposed therein.

Each of the PCMs 679, 689 is any material that melts and solidifies at predetermined temperatures and is capable of storing and releasing thermal energy such as a paraffin wax, an alcohol, water, and any combination thereof, for example. In particular embodiments, the PCMs 679, 689 are different materials of which the melting point of the PCM 689 is higher than the melting point of the PCM 679 so the third layer 634 can further cool the air which has passed through the second layer 632. It is understood, however, that the PCMs 679, 689 can be the same material if desired. The PCMs 679, 689 can also be impregnated with a thermally conductive material such as graphite powder, for example, to further enhance the transfer of thermal energy.

An internal web (not shown) similar to the web 104 in FIG. 3 may be formed in at least one of the second portions 672, 682 of the tubes 650, 652, respectively, to enhance thermal energy conduction from the air flowing through the thermal energy exchanger 626. Alternatively, at least one of the second portions 672, 682 of the tubes 650, 652 can further include a plurality of internal fins (not shown) similar to the fins 89 in FIG. 2 formed on an inner surface thereof. The internal fins further enhance the transfer of thermal energy of the thermal energy exchanger 626.

The remaining structure of the HVAC system 10 is substantially the same as described above for the embodiments illustrated in FIGS. 1-8.

FIG. 10 illustrates an alternative configuration of the thermal energy exchanger 26. In FIG. 10, the thermal energy exchanger 726 has a first layer 730, a second layer 732, and a third layer 734 arranged substantially perpendicular to an air-flowing direction. Additional or fewer layers than shown can be employed as desired. The layers 730, 732, 734 are arranged so the second layer 732 is disposed downstream of the first layer 730 and upstream of the third layer 734. It is understood, however, that the layers 730, 732, 734 can be arranged as desired. The layers 730, 732, 734 can be bonded together by any suitable method as desired such as brazing and welding, for example.

The first layer 730 of the thermal energy exchanger 726 includes an upper fluid manifold 738 and a lower fluid manifold 739. The second layer 732 of the thermal energy exchanger 726 includes an upper divided manifold 740 and a lower divided manifold 741. The third layer 734 of the thermal energy exchanger 726 includes a pair of upper fluid manifolds 742, 743 and a lower fluid manifold 744. A plurality of first tubes 746 extends between the manifolds 738, 739 of the first layer 730. A plurality of second tubes 748 extends between the manifolds 740, 741 of the second layer 732. A plurality of third tubes 750 extends between the manifolds 742, 743, 744 of the third layer 734. In certain embodiments, each of the tubes 746, 748, 750 is provided with louvered fins (not shown) formed thereon. The fins abut an outer surface of the tubes 746, 748, 750 for enhancing thermal energy transfer of the thermal energy exchanger 726.

As shown, each of the tubes 746 of the first layer 730 includes a passage 757 formed therein. The passage 757 formed in the tubes 746 fluidly connects the fluid manifolds 738, 739 for receiving the fluid therein. In particular embodiments, the fluid manifold 738 is an inlet manifold which distributes the fluid into the tubes 746, and the fluid manifold 739 is an outlet manifold which collects the fluid from the tubes 746.

Each of the tubes 748 of the second layer 732 is a divided tube having a first portion 770, a second portion 772, and a third portion 773. The portions 770, 772, 773 are formed substantially parallel to a longitudinal axis of the tubes 748 and arranged so the second portion 772 is positioned downstream of the first portion 770 and upstream of the third portion 773 in respect of the air-flowing direction. Each of the portions 770, 772, 773 includes a passage 774 formed therein. The passage 774 formed in the first and third portions 770, 773 of the tubes 748 fluidly connects a first portion 775 of the first divided manifold 740 and a first portion 776 of the second divided manifold 741 to form a pair of parallel flow paths. The first portions 775, 776 of the divided manifolds 740, 741 and the first and third portions 770, 773 of the tubes 748 receive the fluid therein. In particular embodiments, the first portion 775 of the first divided manifold 740 is an inlet manifold which distributes the fluid into the first and third portions 770, 773 of the tubes 748 and the first portion 776 of the second divided manifold 741 is an outlet manifold which collects the fluid from the first and third portions 770, 773 of the tubes 748. The passage 774 formed in the second portion 772 of the tubes 748 fluidly connects a second portion 777 of the first divided manifold 740 and a first portion 778 of the second divided manifold 741. The second portion 772 of the tubes 748 and the second portions 777, 778 of the divided manifolds 740, 741 include a PCM 779 disposed therein. As shown, a volume of the second portion 777 of the first divided manifold 740 is about one-half a volume of the first portion 775 of the first divided manifold 740. A volume of the second portion 778 of the second divided manifold 741 is about one-half a volume of the first portion 776 of the second divided manifold 741.

Each of the tubes 750 of the third layer 734 is a divided tube having a first portion 780, a second portion 782, and a third portion 783. The portions 780, 782, 783 are formed substantially parallel to a longitudinal axis of the tubes 750 and arranged so the second portion 782 is positioned downstream of the first portion 780 and upstream of the third portion 783 in respect of the air-flowing direction. Each of the portions 780, 782, 783 includes a passage 784 formed therein. The passage 784 formed in the first and third portions 780, 783 of the tubes 750 fluidly connects the fluid manifolds 742, 743, 744 to form a U-shaped flow path. The fluid manifolds 742, 743, 744 and the first and third portions 780, 783 of the tubes 750 receive the fluid therein. In particular embodiments, the fluid manifold 742 is an inlet manifold which distributes the fluid into the first and third portions 780, 783 of the tubes 750, and the fluid manifold 743 is an outlet manifold which collects the fluid from the first and third portions 780, 783 of the tubes 750. The passage 784 formed in the second portion 782 of the tubes 750 is closed by a cover 785. The second portion 782 of the tubes 750 include a PCM 787 disposed therein.

Each of the PCMs 779, 787 is any material that melts and solidifies at predetermined temperatures and is capable of storing and releasing thermal energy such as a paraffin wax, an alcohol, water, and any combination thereof, for example. In particular embodiments, the PCMs 779, 787 are different materials of which the melting point of the PCM 787 is higher than the melting point of the PCM 779 so the third layer 734 can further cool the air which has passed through the second layer 732. It is understood, however, that the PCMs 779, 787 can be the same material if desired. The PCMs 779, 787 can also be impregnated with a thermally conductive material such as graphite powder, for example, to further enhance the transfer of thermal energy.

An internal web (not shown) similar to the web 104 in FIG. 3 may be formed in at least one of the second portions 772, 782 of the tubes 748, 750, respectively, to enhance thermal energy conduction from the air flowing through the thermal energy exchanger 726. Alternatively, at least one of the second portions 772, 782 of the tubes 748, 750, can further include a plurality of internal fins (not shown) similar to the fins 89 in FIG. 2 formed on an inner surface thereof. The internal fins further enhance the transfer of thermal energy of the thermal energy exchanger 726.

The remaining structure of the HVAC system 10 is substantially the same as described above for the embodiments illustrated in FIGS. 1-9

Figure 11:
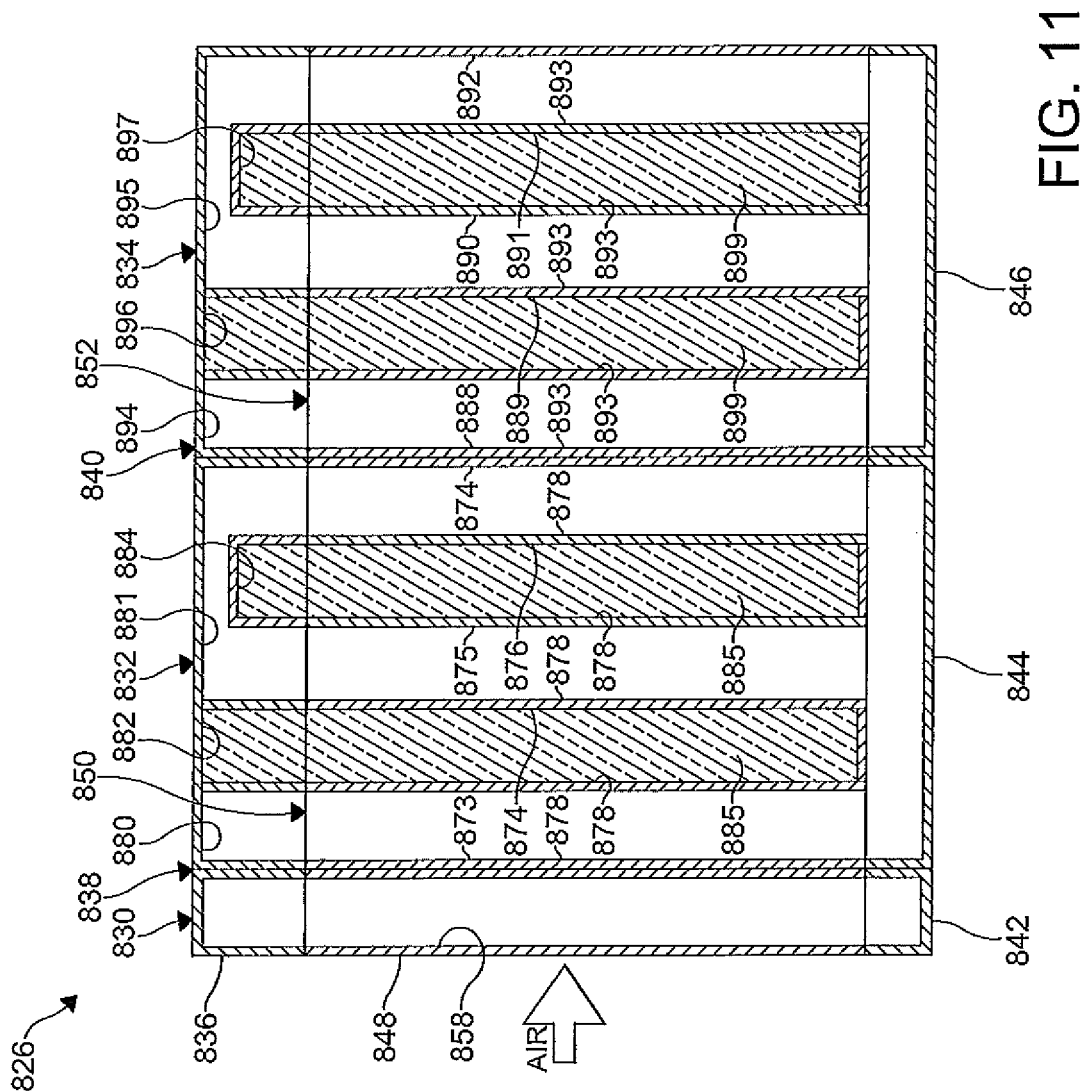
FIG. 11 is an cross-sectional elevational view of a thermal energy exchanger according to another embodiment of the invention, the section taken along a plane substantially parallel to a direction of air flow through the thermal energy exchanger, wherein the thermal energy exchanger includes a plurality of divided tubes having a phase change material disposed in a portion thereof, and wherein at least one of the tubes has a substantially serpentine shaped flow path.

FIG. 11 illustrates an alternative configuration of the thermal energy exchanger 26. In FIG. 11, the thermal energy exchanger 826 has a first layer 830, a second layer 832, and a third layer 834 arranged substantially perpendicular to an air-flowing direction. Additional or fewer layers than shown can be employed as desired. The layers 830, 832, 834 are arranged so the second layer 832 is disposed downstream of the first layer 830 and upstream of the third layer 834. It is understood, however, that the layers 830, 832, 834 can be arranged as desired. The layers 830, 832, 834 can be bonded together by any suitable method as desired such as brazing and welding, for example.

The first layer 830 includes an upper first fluid manifold 836 and a lower second fluid manifold 842. Each of the layers 832, 834 of the thermal energy exchanger 826 includes a divided manifold 838, 840 and a fluid manifold 844, 846, respectively. A plurality of first tubes 848 extends between the manifolds 836, 842 of the first layer 830. A plurality of second tubes 850 extends between the manifolds 838, 844 of the second layer 832. A plurality of third tubes 852 extends between the manifolds 840, 846 of the third layer 834. In certain embodiments, each of the tubes 848, 850, 852 is provided with louvered fins (not shown) formed thereon. The fins abut an outer surface of the tubes 848, 850, 852 for enhancing thermal energy transfer of the thermal energy exchanger 826.

As shown, each of the tubes 848 of the first layer 830 includes a passage 858 formed therein. The passage 858 formed in the tubes 848 fluidly connects the fluid manifolds 836, 842 for receiving the fluid therein. In particular embodiments, the first fluid manifold 836 is an inlet manifold which distributes the fluid into the tubes 848 and the second fluid manifold 842 is an outlet manifold which collects the fluid from the tubes 848.

Each of the tubes 850 of the second layer 832 is a divided tube having a first portion 873, a second portion 874, a third portion 875, a fourth portion 876, and a fifth portion 877. The portions 873, 874, 875, 876, 877 are formed substantially parallel to a longitudinal axis of the tubes 850 and arranged so the second portion 874 is positioned downstream of the first portion 873, the third portion 875 is positioned downstream of the second portion 874, the fourth portion 876 is disposed downstream of the third portion 875, and the fifth portion 877 is disposed downstream of the fourth portion 876 in respect of the air-flowing direction.

Each of the portions 873, 874, 875, 876, 877 includes a passage 878 formed therein. The passage 878 formed in the first, third, and fifth portions 873, 875, 877 of the tubes 850 fluidly connects a first and a second portion 880, 881, respectively, of the divided manifold 838 and the fluid manifold 844 to form a flow path having a substantially serpentine-like shape. The first and second portions 880, 881 of the divided manifold 838, the first, third, and fifth portions 873, 875, 877 of the tubes 850, and the fluid manifold 844 receive the fluid therein. In particular embodiments, the first portion 880 of the divided manifold 838 is an inlet manifold which distributes the fluid into the first, third, and fifth portions 873, 875, 877 of the tubes 850 and the fluid manifold 844 is an outlet manifold which collects the fluid from the first, third, and fifth portions 873, 875, 877 of the tubes 850. The passage 878 formed in the second and fourth portions 874, 876 of the tubes 850 is in fluid communication with a third and a fourth portion 882, 884 of the divided manifold 838. The second and fourth portions 874, 876 of the tubes 850 and the second and fourth portions 882, 884 of the divided manifold 838 include a PCM 885 disposed therein. As shown, a volume of the second and fourth portions 882, 884 of the divided manifold 838 is about two-thirds a combined volume of the first and second portions 880, 881 of the divided manifold 838.

Each of the tubes 852 of the third layer 834 is a divided tube having a first portion 888, a second portion 889, a third portion 890, a fourth portion 891, and a fifth portion 892. The portions 888, 889, 890, 891, 892 are formed substantially parallel to a longitudinal axis of the tubes 852 and arranged so the second portion 889 is positioned downstream of the first portion 888, the third portion 890 is positioned downstream of the second portion 889, the fourth portion 891 is disposed downstream of the third portion 890, and the fifth portion 892 is disposed downstream of the fourth portion 891 in respect of the air-flowing direction.

Each of the portions 888, 889, 890, 891, 892 includes a passage 893 formed therein. The passage 893 formed in the first, third, and fifth portions 888, 890, 892 of the tubes 852 fluidly connects a first and a second portion 894, 895, respectively, of the divided manifold 840 and the fluid manifold 846 to form a flow path having a substantially serpentine-like shape. The first and second portions 894, 895 of the divided manifold 840, the first, third, and fifth portions 888, 890, 892 of the tubes 852, and the fluid manifold 846 receive the fluid therein. In particular embodiments, the first portion 894 of the divided manifold 840 is an inlet manifold which distributes the fluid into the first, third, and fifth portions 888, 890, 892 of the tubes 852 and the fluid manifold 846 is an outlet manifold which collects the fluid from the first, third, and fifth portions 888, 890, 892 of the tubes 852. The passage 893 formed in the second and fourth portions 889, 891 of the tubes 852 is in fluid communication with a third and a fourth portion 896, 897 of the divided manifold 840. The second and fourth portions 889, 891 of the tubes 852 and the second and fourth portions 896, 897 of the divided manifold 840 include a PCM 899 disposed therein. As shown, a volume of the second and fourth portions 896, 897 of the divided manifold 840 is about two-thirds a combined volume of the first and second portions 894, 895 of the divided manifold 840.

Each of the PCMs 885, 899 is any material that melts and solidifies at predetermined temperatures and is capable of storing and releasing thermal energy such as a paraffin wax, an alcohol, water, and any combination thereof, for example. In particular embodiments, the PCMs 885, 899 are different materials of which the melting point of the PCM 899 is higher than the melting point of the PCM 885 so the third layer 834 can further cool the air which has passed through the second layer 832. It is understood, however, that the PCMs 885, 899 can be the same material if desired. The PCMs 885, 899 can also be impregnated with a thermally conductive material such as graphite powder, for example, to further enhance the transfer of thermal energy.

An internal web (not shown) similar to the web 104 in FIG. 3 may be formed in at least one of the second portions 874, 889 and the fourth portions 876, 891 of the tubes 850, 852, respectively, to enhance thermal energy conduction from the air flowing through the thermal energy exchanger 826. Alternatively, at least one of the second portions 874, 889 and the fourth portions 876, 891 of the tubes 850, 852, respectively, can further include a plurality of internal fins (not shown) similar to the fins 89 in FIG. 2 formed on an inner surface thereof. The internal fins further enhance the transfer of thermal energy of the thermal energy exchanger 826.

The remaining structure of the HVAC system 10 is substantially the same as described above for the embodiments illustrated in FIGS. 1-10.

FIG. 12 illustrates an alternative configuration of the thermal energy exchanger 26. In FIG. 12, the thermal energy exchanger 926 includes at least one layer 928 maximizing thermal energy storage capacity. The layer 928 of the thermal energy exchanger 926 includes a plurality of tubes 930. Each of the tubes 930 is provided with louvered fins 932 formed thereon. The fins 932 abut an outer surface of the tubes 930 for enhancing thermal energy transfer of the thermal energy exchanger 926. The fins 932 include a plurality of crests 934 formed thereon. The crests 934 are formed substantially parallel to each other and at a substantially 90 degree angle to the tubes 930. It is understood that the crests 934 can be formed at any angle to the tubes 930 if desired. Each of the crests 934 defines an air space 936 extending between the tubes 930 and the fins 932. It is understood that the thermal energy exchanger 926 can be constructed as a finless heat exchanger if desired.

Each of the tubes 930 further includes a passage 938 formed therein. The passage 938 fluidly connects the tubes 930 with an upper fluid manifold 940 and a lower fluid manifold (not shown). The tubes 930, the upper fluid manifold 940, and the lower fluid manifold receive the fluid therein. As illustrated, a PCM manifold 942 is formed around at least a portion of an outer periphery of the tubes 930 and the fins 932. The tubes 930 extend through the PCM manifold 942 and between the upper fluid manifold 940 and the lower fluid manifold. A secondary PCM manifold 944 can be formed in at least one of the upper fluid manifold 940 and the lower fluid manifold if desired. The PCM manifolds 942, 944 include a PCM 946 disposed therein. The PCM manifolds 942, 944 are sealed to militate against leakage of the PCM 946 in the fluid. The PCM manifolds 942, 944 are filled by heating the PCM 946 above a melting point thereof until the PCM 946 is a liquid which can be easily poured into an opening (not shown) of the PCM manifolds 942, 944. The PCM 946 absorbs thermal energy from the air flowing through the thermal energy exchanger 926 when the fuel-powered engine is not in operation. Accordingly, when the fuel-powered engine of the vehicle is in operation, the PCM 946 releases thermal energy into conditioned air from the evaporator 24 flowing therethrough.

The remaining structure of the thermal energy exchanger 926 and the HVAC system 10 is substantially the same as described above for the embodiments illustrated in FIGS. 1-11.

FIG. 13 illustrates an alternative configuration of the thermal energy exchanger 26. In FIG. 13, the thermal energy exchanger 1026 includes at least one layer 1028 maximizing thermal energy storage capacity. The layer 1028 of the thermal energy exchanger 1026 includes a plurality of tubes 1030. Each of the tubes 1030 is provided with louvered fins 1032 formed thereon. The fins 1032 abut an outer surface of the tubes 1030 for enhancing thermal energy transfer of the thermal energy exchanger 1026. The fins 1032 include a plurality of crests 1034 formed thereon. The crests 1034 are formed substantially parallel to each other and at a substantially 90 degree angle to the tubes 1030. It is understood that the crests 1034 can be formed at any angle to the tubes 1030 if desired. Each of the crests 1034 defines an air space 1036 extending between the tubes 1030 and the fins 1032. It is understood that the thermal energy exchanger 1026 can be constructed as a finless heat exchanger if desired.

Each of the tubes 1030 further includes a passage 1038 formed therein. The passage 1038 fluidly connects the tubes 1030 with an upper fluid manifold 1040 and a lower fluid manifold (not shown). The tubes 1030, the upper fluid manifold 1040, and the lower fluid manifold receive the fluid therein. As illustrated, a PCM manifold 1042 is formed around at least a portion of an outer periphery of the tubes 1030 and the fins 1032. The tubes 1030 extend through the PCM manifold 1042 and between the upper fluid manifold 1040 and the lower fluid manifold. A secondary PCM manifold 1044 can be formed adjacent an outer surface 1045 of at least one of the upper fluid manifold 1040 and the lower fluid manifold if desired. The PCM manifolds 1042, 1044 include a PCM 1046 disposed therein. The PCM manifolds 1042, 1044 are sealed to militate against leakage of the PCM 1046 in the fluid. The PCM manifolds 1042, 1044 are filled by heating the PCM 1046 above a melting point thereof until the PCM 1046 is a liquid which can be easily poured into an opening (not shown) of the PCM manifolds 1042, 1044. The PCM 1046 absorbs thermal energy from the air flowing through the thermal energy exchanger 1026 when the fuel-powered engine is not in operation. Accordingly, when the fuel-powered engine of the vehicle is in operation, the PCM 1046 releases thermal energy into conditioned air from the evaporator 24 flowing therethrough.

The remaining structure of the thermal energy exchanger 1026 and the HVAC system 10 is substantially the same as described above for the embodiments illustrated in FIGS. 1-12.

FIG. 14 illustrates an alternative configuration of the thermal energy exchanger 26. In FIG. 14, the thermal energy exchanger 1126 includes at least one layer 1128 maximizing thermal energy storage capacity. The layer 1128 of the thermal energy exchanger 1126 includes a plurality of tubes 1130. Each of the tubes 1130 is provided with louvered fins 1132 formed thereon. The fins 1132 abut an outer surface of the tubes 1130 for enhancing thermal energy transfer of the thermal energy exchanger 1126. The fins 1132 include a plurality of crests 1134 formed thereon. The crests 1134 are formed substantially parallel to each other and at substantially 90 degree angle to the tubes 1130. It is understood that the crests 1134 can be formed at any angle to the tubes 1130 if desired. Each of the crests 1134 defines an air space 1136 extending between the tubes 1130 and the fins 1132. It is understood that the thermal energy exchanger 1126 can be constructed as a finless heat exchanger if desired.

Each of the tubes 1130 further includes a passage 1138 formed therein. The passage 1138 fluidly connects the tubes 1130 with an upper fluid manifold 1140 and a lower fluid manifold (not shown). The tubes 1130, the upper fluid manifold 1140, and the lower fluid manifold receive the fluid therein. As illustrated, a PCM manifold 1142 is formed around at least a portion of an outer periphery of the tubes 1130 and the fins 1132. The tubes 1130 extend through the PCM manifold 1142 and between the upper fluid manifold 1140 and the lower fluid manifold. A secondary PCM manifold 1144 is formed around an outer periphery of the thermal energy exchanger 1126. As shown, the PCM manifolds 1142, 1144 can be integrally formed if desired. The PCM manifolds 1142, 1144 include a PCM 1146 disposed therein. The PCM manifolds 1142, 1144 are sealed to militate against leakage of the PCM 1146 into the fluid of from the thermal energy exchanger 1126. The PCM manifolds 1142, 1144 are filled by heating the PCM 1146 above a melting point thereof until the PCM 1146 is a liquid which can be easily poured into an opening (not shown) of the PCM manifolds 1142, 1144. The PCM 1146 absorbs thermal energy from the air flowing through the thermal energy exchanger 1126 when the fuel-powered engine is not in operation. Accordingly, when the fuel-powered engine of the vehicle is in operation, the PCM 1146 releases thermal energy into conditioned air from the evaporator 24 flowing therethrough.

The remaining structure of the thermal energy exchanger 1126 and the HVAC system 10 is substantially the same as described above for the embodiments illustrated in FIGS. 1-13.

FIG. 15 illustrates an alternative configuration of the thermal energy exchanger 26. In FIG. 15, the thermal energy exchanger 1226 includes at least one layer 1228 maximizing thermal energy storage capacity. The layer 1228 of the thermal energy exchanger 1226 includes a plurality of first tubes 1230 a plurality of second tubes 1231. Each of the tubes 1230 is provided with louvered fins 1232 formed thereon. The fins 1232 abut an outer surface of the tubes 1230 for enhancing thermal energy transfer of the thermal energy exchanger 1226. The fins 1232 include a plurality of crests 1234 formed thereon. The crests 1234 are formed substantially parallel to each other and at a substantially 90 degree angle to the tubes 1230. It is understood that the crests 1234 can be formed at any angle to the tubes 1230 if desired. Each of the crests 1234 defines an air space 1236 extending between the tubes 1230 and the fins 1232. It is understood that the thermal energy exchanger 1226 can be constructed as a finless heat exchanger if desired.

Each of the tubes 1230, 1231 further include a passage 1238 formed therein. The tubes 1230 and the tubes 1231 are arranged in an alternating pattern. The passage 1238 of the tubes 1230 fluidly connects the tubes 1230 with an upper fluid manifold 1240 and a lower fluid manifold (not shown). The tubes 1230, the upper fluid manifold 1240, and the lower fluid manifold receive the fluid therein. The passage 1238 formed in each of the tubes 1231 is in fluid communication with a respective PCM manifold 1242. Each of the PCM manifolds 1242 extends between a pair of the tubes 1230. A secondary PCM manifold 1244 is formed around at least a portion of an outer periphery of the thermal energy exchanger 1226. In certain embodiments, the PCM manifold 1244 is formed around an entire outer periphery of the thermal energy exchanger 1226 if desired. As shown, at least one of the PCM manifolds 1242 and the PCM manifold 1244 can be integrally formed if desired. The tubes 1231 and the PCM manifolds 1242, 1244 include a PCM 1246 disposed therein. The PCM manifolds 1242, 1244 are sealed to militate against leakage of the PCM 1246 into the fluid or from the thermal energy exchanger 1226. The PCM manifolds 1242, 1244 are filled by heating the PCM 1246 above a melting point thereof until the PCM 1246 is a liquid which can be easily poured into an opening (not shown) of the PCM manifolds 1242, 1244. The PCM 1246 absorbs thermal energy from the air flowing through the thermal energy exchanger 1226 when the fuel-powered engine is not in operation. Accordingly, when the fuel-powered engine of the vehicle is in operation, the PCM 1246 releases thermal energy into conditioned air from the evaporator 24 flowing therethrough.

The remaining structure of the thermal energy exchanger 1226 and the HVAC system 10 is substantially the same as described above for the embodiments illustrated in FIGS. 1-14.

It is understood that the operation of the HVAC system 10 including the thermal energy exchanger 26 is substantially similar to the operation of the HVAC system 10 including the alternate configurations of the thermal energy exchangers 126, 226, 326, 426, 526, 626, 726, 826, 926, 1026, 1126, 1226. Accordingly, for simplicity, only the operation of the HVAC system 10 including the thermal energy exchanger 26 is described hereinafter.

In operation, the HVAC system 10 conditions air by heating or cooling the air, and providing the conditioned air to the passenger compartment of the vehicle. Air flows through the housing 14 of the module 12. Air from the supply of air is received in the inlet section 16 of the housing 14 in the air inlet 22.

When the fuel-powered engine of the vehicle is in operation, the fluid from the source of cooled fluid 30 circulates through the conduit 36. Accordingly, the fluid circulates through the evaporator core 24, as shown in FIG. 1. The air from the inlet section 16 flows into the evaporator core 24 where the air is cooled to a desired temperature by a transfer of thermal energy from the air to the fluid from the source of cooled fluid 30. The conditioned air stream then exits the evaporator core 24. When the HVAC system 10 is not operating in the pull-down mode, the air from the evaporator core 24 is selectively permitted by the blend door 50 to flow into the thermal energy exchanger 26.

In the thermal energy exchanger 26, the conditioned air flows through the air spaces 88 defined by the louvered fins 84 and the tubes 78, 80, 82 of the thermal energy exchanger 26. The conditioned air absorbs thermal energy from the PCM 94 disposed in the tubes 80 and the PCM 100 disposed in the tubes 82. The transfer of thermal energy from the PCMs 94, 100 to the conditioned air cools and solidifies the PCMs 94, 100. It is understood that the fluid from the source of cooled fluid 30 can also circulate through the conduit 38 and the thermal energy exchanger 26. The fluid flows from the source of cooled fluid 30 through the tubes 78, set A of tubes 80, and set C of tubes 82 to absorb thermal energy from the PCMs 94, 100 disposed in set B of tubes 80 and set C of tubes 82, respectively. Accordingly, the transfer of thermal energy to the fluid further cools and solidifies the PCMs 94, 100.

When the fuel-powered engine of the vehicle is not in operation, the fluid from the source of cooled fluid 30 does not circulate through the conduits 36, 38. Accordingly, the fluid does not circulate through the evaporator core 24 or the thermal energy exchanger 26. The air from the inlet section 16 flows into and through the evaporator core 24 where a temperature thereof is unchanged. The air stream then exits the evaporator core 24 and is selectively permitted by the blend door 50 to flow into the thermal energy exchanger 26.

In the thermal energy exchanger 26, the air flows through the air spaces 88 defined by the louvered fins 84 and the tubes 78, 80, 82 of the thermal energy exchanger 26. The air is cooled to a desired temperature by a transfer of thermal energy from the PCMs 94, 100 disposed in set B of tubes 80 and set C of tubes 82, respectively, to the air. Accordingly, the PCMs 94, 100 are caused to melt. The conditioned cooled air then exits the thermal energy exchanger 26 and flows through the heater core 28 and into the outlet and distribution section.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A thermal energy exchanger for a heating, ventilating, and air conditioning system that exchanges thermal energy between a first fluid and a second fluid, the thermal energy exchanger comprising:
   a first row of first tubes, wherein each of the first tubes receives the first fluid therein;
   a second row of second tubes disposed directly downstream of the first tubes with respect to a flow path of the second fluid, a portion of the second tubes receiving the first fluid therein, the remaining second tubes including a phase change material disposed therein;
   in the second row, the second tubes receiving the first fluid therein and the second tubes including the PCM disposed therein alternate;
   a third row of third tubes disposed directly downstream of the second tubes with respect to the flow path of the second fluid, a portion of the third tubes receiving the first fluid therein, the remaining third tubes including a phase change material disposed therein;
   the second tubes with phase change material disposed therein contacting the third tubes receiving the first fluid therein;
   the second tubes receiving the first fluid therein contacting the third tubes with phase change material disposed therein.

2. The thermal energy exchanger according to claim 1, wherein at least one of the second tubes including the phase change material disposed therein includes at least one of an internal fin and an hourglass-shaped web formed therein.

3. The thermal energy exchanger according to claim 1, further comprising a phase change material manifold disposed around at least a portion of an outer periphery of at least one of the first tubes, the second tubes, and the third tubes.

4. The thermal energy exchanger according to claim 1, wherein the at least one of the third tubes including the phase change material disposed therein includes at least one of an internal fin and an hourglass-shaped web formed therein.

5. The thermal energy exchanger according to claim 1, wherein the phase change material disposed in the third tubes is substantially identical to the phase change material disposed in the second tubes.

6. The thermal energy exchanger according to claim 1, wherein a melting point of the phase change material disposed in at least one of the second tubes is higher than a melting point of the phase change material disposed in at least one of the third tubes.

7. The thermal energy exchanger according to claim 1, wherein at least one of the second tubes including the phase change material disposed therein and at least one of the third tubes including the phase change material disposed therein are in fluid communication with at least one phase change material manifold.

8. The thermal energy exchanger according to claim 1, further comprising at least one fluid manifold in fluid communication with at least one of the first tubes receiving the first fluid therein, the second tubes receiving the first fluid therein, and the third tubes receiving the first fluid therein.

9. The thermal energy exchanger according to claim 8, further comprising a secondary phase change material manifold disposed in the at least one fluid manifold.

10. The thermal energy exchanger according to claim 8, further comprising a secondary phase change material manifold disposed adjacent an outer surface of the at least one fluid manifold.

11. The thermal energy exchanger according to claim 3, further comprising a secondary phase change material manifold disposed around at least a portion of an outer periphery of the thermal energy exchanger.

12. A thermal energy exchanger for a heating, ventilating, and air conditioning system that exchanges thermal energy between a first fluid and a second fluid, the thermal energy exchanger comprising:
    a first row of first tubes, wherein each of the first tubes receive the first fluid therein;
    a second row of second tubes disposed directly downstream of the first tubes with respect to a flow path of the second fluid, a portion of the second tubes receiving the first fluid therein, the remaining second tubes including a phase change material disposed therein;

in the second row, the second tubes receiving the first fluid therein and the second tubes including the PCM disposed therein alternate;

a third row of third tubes disposed directly downstream of the second tubes with respect to the flow path of the second fluid, a portion of the third tubes receiving the first fluid therein, the remaining third tubes including a phase change material disposed therein;

the melting point of the phase change material disposed in the second tubes being greater than the melting point of the phase change material disposed in the third tubes.

13. The thermal energy exchanger according to claim 12, wherein the third tubes receiving the first fluid therein and the third tubes including the phase change material disposed therein alternate.

14. A thermal energy exchanger for a heating, ventilating, and air conditioning system that exchanges thermal energy between a first fluid and a second fluid, the thermal energy exchanger comprising:

a plurality of first tubes, each of the first tubes receives the first fluid therein; and a plurality of second tubes disposed downstream of the first tubes with respect to a flow path of the second fluid, wherein a first portion of each of the second tubes receives the first fluid therein and a second portion of each of the second tubes includes a phase change material disposed therein, a plurality of third tubes disposed downstream of the second tubes with respect to the flow path of the second fluid, wherein a first portion of each of the third tubes receives the first fluid therein and a second portion of each of the third tubes includes a phase change material therein;

each of the second tubes connected to a divided manifold and a common manifold; the first fluid taking a U-shaped flow path through the second tubes from a first portion of the divided manifold, through the common manifold, to the second portion of the divided manifold;

a third portion of the divided manifold containing the phase change material of the second tubes, and at least one of the following numbered features are present:
1) the first tubes are connected to an inlet manifold and an outlet manifold, the first fluid taking a straight flow path from the inlet manifold to the outlet manifold;
2) each of the first tubes defines a single inner volume, the first fluid being in fluid communication with the entire single inner volume; or
3) the first tubes are connected to an inlet manifold and an outlet manifold, the inlet manifold adjacent to the divided manifold, the outlet manifold adjacent to the common manifold.

15. The thermal energy exchanger according to claim 14, wherein the flow of the first fluid through the third tubes is U-shaped.

16. The thermal energy exchanger according to claim 14, wherein the melting point of the PCM disposed in the third tubes is different from the melting point of the PCM disposed in the second tubes.

17. The thermal energy exchanger according to claim 14, wherein the third portion of the divided manifold is located between the first and second portions of the divided manifold.

* * * * *